US012749719B2

(12) United States Patent
Chua et al.

(10) Patent No.: US 12,749,719 B2
(45) Date of Patent: Sep. 29, 2026

(54) ENERGY STORAGE DEVICE AND METHOD OF ASSEMBLY OF AN ENERGY STORAGE DEVICE

(71) Applicant: NANYANG TECHNOLOGICAL UNIVERSITY, Singapore (SG)

(72) Inventors: Yong Sheng Rodney Chua, Singapore (SG); Yi Cai, Singapore (SG); Jun Jie Ernest Tang, Singapore (SG); Madhavi Srinivasan, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 483 days.

(21) Appl. No.: 18/561,241

(22) PCT Filed: May 18, 2022

(86) PCT No.: PCT/SG2022/050332
§ 371 (c)(1),
(2) Date: Nov. 15, 2023

(87) PCT Pub. No.: WO2022/245296
PCT Pub. Date: Nov. 24, 2022

(65) Prior Publication Data

US 2024/0266612 A1 Aug. 8, 2024

(30) Foreign Application Priority Data

May 18, 2021 (SG) ........................... 10202105206Y

(51) Int. Cl.
*H01M 50/107* (2021.01)
*H01M 10/04* (2006.01)
(Continued)

(52) U.S. Cl.
CPC ....... *H01M 10/288* (2013.01); *H01M 10/049* (2013.01); *H01M 50/107* (2021.01); *H01M 50/417* (2021.01); *H01M 50/469* (2021.01)

(58) Field of Classification Search
None
See application file for complete search history.

(56) References Cited

U.S. PATENT DOCUMENTS 3,859,137 A 1/1975 Jammet
4,237,199 A 12/1980 Gelin
(Continued)

FOREIGN PATENT DOCUMENTS

CN 209087916 U 7/2019
CN 209843832 U 12/2019
(Continued)

OTHER PUBLICATIONS

Used Lithium Battery Mysteries | Big Mess O' Wires, BMOW Floppy Disk Emulator [retrieved from Internet Jan. 12, 2024] https://www.bigmessowires.com/2020/02/26/used-lithium-battery-mysteries/ (7 pages).
(Continued)

*Primary Examiner* — Carlos Barcena
(74) *Attorney, Agent, or Firm* — ALSTON & BIRD LLP

(57) ABSTRACT

An energy storage device may include a housing and an electrolyte-impermeable-barrier-member disposed within an internal space of the housing. The electrolyte-impermeable-barrier-member may partition the internal space of the housing into a receptacle space and an intervening space. The energy storage device may further include a first electrode disposed in the intervening space and a second electrode disposed in the receptacle space. The electrolyte-impermeable-barrier-member may define at least one through-hole serving as a channel connecting the receptacle
(Continued)

space and the intervening space. The electrolyte-impermeable-barrier-member may further include an electrolyte disposed with respect to the electrolyte-impermeable-barrier-member in a manner so as to be shielded by the electrolyte-impermeable-barrier-member from direct contact with the housing, wherein the electrolyte may interact with the second electrode within the receptacle space and may reach through the at least one through-hole of the electrolyte-impermeable-barrier-member to interact with the first electrode within the intervening space.

20 Claims, 15 Drawing Sheets

(51) Int. Cl.

| | |
|---|---|
| ***H01M 10/28*** | (2006.01) |
| ***H01M 50/417*** | (2021.01) |
| ***H01M 50/469*** | (2021.01) |

(56) References Cited

U.S. PATENT DOCUMENTS

| | | | |
|---|---|---|---|
| 4,648,177 | A | 3/1987 | Uba et al. |
| 4,929,518 | A | 5/1990 | Yoshinaka et al. |
| 4,939,518 | A | 7/1990 | Hotta et al. |
| 5,047,301 | A | 9/1991 | Adlhart et al. |
| 5,665,487 | A | 9/1997 | Dhanji |
| 6,447,669 | B1 | 9/2002 | Lain |
| 8,703,330 | B2 | 4/2014 | Phillips et al. |
| 8,979,006 | B2 | 3/2015 | Pudas et al. |
| 10,205,175 | B2 | 2/2019 | Dannoura |
| 10,381,688 | B2 | 8/2019 | Batson et al. |
| 10,522,883 | B2 | 12/2019 | Ellis |
| 2010/0136409 | A1 | 6/2010 | Straubel et al. |
| 2011/0294008 | A1 | 12/2011 | Lara-Curzio et al. |
| 2016/0351968 | A1 | 12/2016 | Wang et al. |
| 2019/0058190 | A1 | 2/2019 | Freyer et al. |
| 2020/0411830 | A1 | 12/2020 | Whear |
| 2021/0013500 | A1 | 1/2021 | Yushin et al. |
| 2021/0020883 | A1 | 1/2021 | Roberts et al. |

FOREIGN PATENT DOCUMENTS

| | | | | |
|---|---|---|---|---|
| FR | 2599897 A1 | | 12/1987 | |
| WO | WO 2020/102661 A1 | | 5/2020 | |
| WO | WO-2020153125 A1 | * | 7/2020 | .......... H01M 50/443 |

OTHER PUBLICATIONS

International Search Report and Written Opinion for PCT/SG2022/050332 (ISA/SG) mailed Sep. 23, 2022 (9 pages).

* cited by examiner

ENERGY STORAGE DEVICE AND METHOD OF ASSEMBLY OF AN ENERGY STORAGE DEVICE

CROSS-REFERENCE TO RELATED APPLICATIONS

The present application is a national phase entry of International Application No. PCT/SG2022/050332, filed May 18, 2022, which claims priority to Singapore Application No. 10202105206Y, filed May 18, 2021, which is incorporated herein by reference in its entirety.

TECHNICAL FIELD

Embodiments generally relate to an energy storage device or system (e.g. battery, cell, etc.), and particularly to an aqueous-based energy storage device or system.

BACKGROUND

Conventional energy storage devices or systems (e.g. energy storage electrochemical cells) may vary from small-sized coin cells (e.g., CR2016, CR2032, etc.) to cylindrical cells (e.g., AAA, AA, 18650) to larger-sized cells (e.g. pouch cells), most or all of which may include a metallic housing or casing. However, conventional energy storage devices (e.g. an alkaline battery) generally involve use of an electrolyte which may react with their metallic housings, via an electrolytic corrosion process, to corrode the metallic housings of these conventional energy storage devices. Corrosion of the metallic housings, in turn, may lead to leakage of the electrolyte from the conventional energy storage devices.

In addition to the above issues faced by conventional energy storage devices, convention aqueous-based energy storage devices (e.g. aqueous-based cells), in particular, are susceptible to electrolyte loss, which may occur during electrochemical cycling of these aqueous-based energy storage devices. This is because convention aqueous-based energy storage devices have a relatively small electrochemical stability window, and thus, decomposition of water within the conventional energy storage devices and side reactions, such as oxygen and hydrogen evolution, are inevitable or are likely to occur within the convention aqueous-based energy storage devices. Such processes or reactions consume the electrolyte, which result in the electrolyte loss. To compensate for electrolyte loss, a relatively large volume of electrolyte would generally be required for convention aqueous-based energy storage devices. However, larger-sized cells (e.g. pouch cells), capable of holding larger volumes of electrolyte, are more susceptible to "bloating", which may be caused by evolution of gases from an aqueous electrolyte used in these convention aqueous-based energy storage devices, in turn, leading to cell failure of these convention aqueous-based energy storage devices.

On another note, with conventional energy storage devices having cylindrical cell configurations (e.g. cylindrical cells), a cathode is typically coated on an aluminum foil current collector and rolled up with the separator and anode, and thereafter inserted into a housing of the cylindrical cell. Typically, a resilient material (e.g. tending to spring back to its original shape) and/or a rigid material, such as stainless steel, titanium, or carbon-based materials, would be used for the current collector of these conventional cylindrical cells. Because such resilient and/or rigid material(s) are used, such cylindrical cells may experience delamination of the resilient and/or rigid material(s) after they are rolled into the cylindrical cell configuration. Moreover, during electrochemical cycling of conventional cylindrical cells, gas bubbles formed between its cathode and current collector may accelerate the abovesaid material delamination process, leading to rapid decay or deterioration in cell performance of these cells.

Accordingly, there is a need for an improved energy storage device (e.g. battery, cell, etc.) which solves at least the above issues faced by conventional energy storage devices.

SUMMARY

According to various embodiments, there may be provided an energy storage device. The energy storage device may include a housing defining an internal space. The energy storage device may include (e.g. further include) an electrolyte-impermeable-barrier-member disposed within the internal space of the housing. The electrolyte-impermeable-barrier-member may include a base portion and at least one side wall extending from the base portion of the electrolyte-impermeable-barrier-member to form a receptacle structure. The electrolyte-impermeable-barrier-member may partition the internal space of the housing into a receptacle space bound by the electrolyte-impermeable-barrier-member and an intervening space between the housing and the electrolyte-impermeable-barrier-member. The receptacle structure forming the electrolyte-impermeable-barrier-member may include or may define at least one through-hole serving as a channel connecting the receptacle space and the intervening space. The energy storage device may include a first electrode disposed in the intervening space between the housing and the electrolyte-impermeable-barrier-member. The energy storage device may include a second electrode disposed in the receptacle space within the electrolyte-impermeable-barrier-member. The energy storage device may include an electrolyte disposed with respect to the electrolyte-impermeable-barrier-member in a manner so as to be shielded by the electrolyte-impermeable-barrier-member from direct contact with the housing, wherein the electrolyte interacts with the second electrode within the receptacle space of the electrolyte-impermeable-barrier-member and reaches through the at least one through-hole of the electrolyte-impermeable-barrier-member to interact with the first electrode within the intervening space between the housing and the electrolyte-impermeable-barrier-member.

According to various embodiments, there may be provided a method of assembling an energy storage device. The method may include providing a housing which defines an internal space. The method may include (e.g. further include) disposing a first electrode into the internal space of the housing. The method may include disposing an electrolyte-impermeable-barrier-member, which may include a base portion and at least one side wall extending from the base portion of the electrolyte-impermeable-barrier-member forming a receptacle structure, into the internal space of the housing in a manner so as to partition the internal space of the housing into a receptacle space bound by the electrolyte-impermeable-barrier-member and an intervening space between the housing and the electrolyte-impermeable-barrier-member. The first electrode may be in the intervening space between the housing and the electrolyte-impermeable-barrier-member. The method may include disposing a second electrode in the receptacle space within the electrolyte-impermeable-barrier-member. The method may include disposing an electrolyte with respect to the electrolyte-impermeable-barrier-member in a manner so as to shield the electrolyte from direct contact with the housing, wherein the electrolyte interacts with the second electrode within the receptacle space of the electrolyte-impermeable-barrier-member and reaches through at least one through-hole of the receptacle structure of the electrolyte-impermeable-barrier-member to interact with the first electrode within the intervening space between the housing and the electrolyte-impermeable-barrier-member, wherein the at least one through-hole serves as a channel connecting the receptacle space of the electrolyte-impermeable-barrier-member and the intervening space between the housing and the electrolyte-impermeable-barrier-member.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 5(*d*) to FIG. 5(*f*) show various views of the plug of the prototype energy storage device of FIG. 4(*a*) to FIG. 4(*e*) used in an unlocking operation to remove the plug from the internal housing of the energy storage device of FIG. 4(*a*) to FIG. 4(*e*), according to various embodiments processes.

DETAILED DESCRIPTION

Figure 1A:
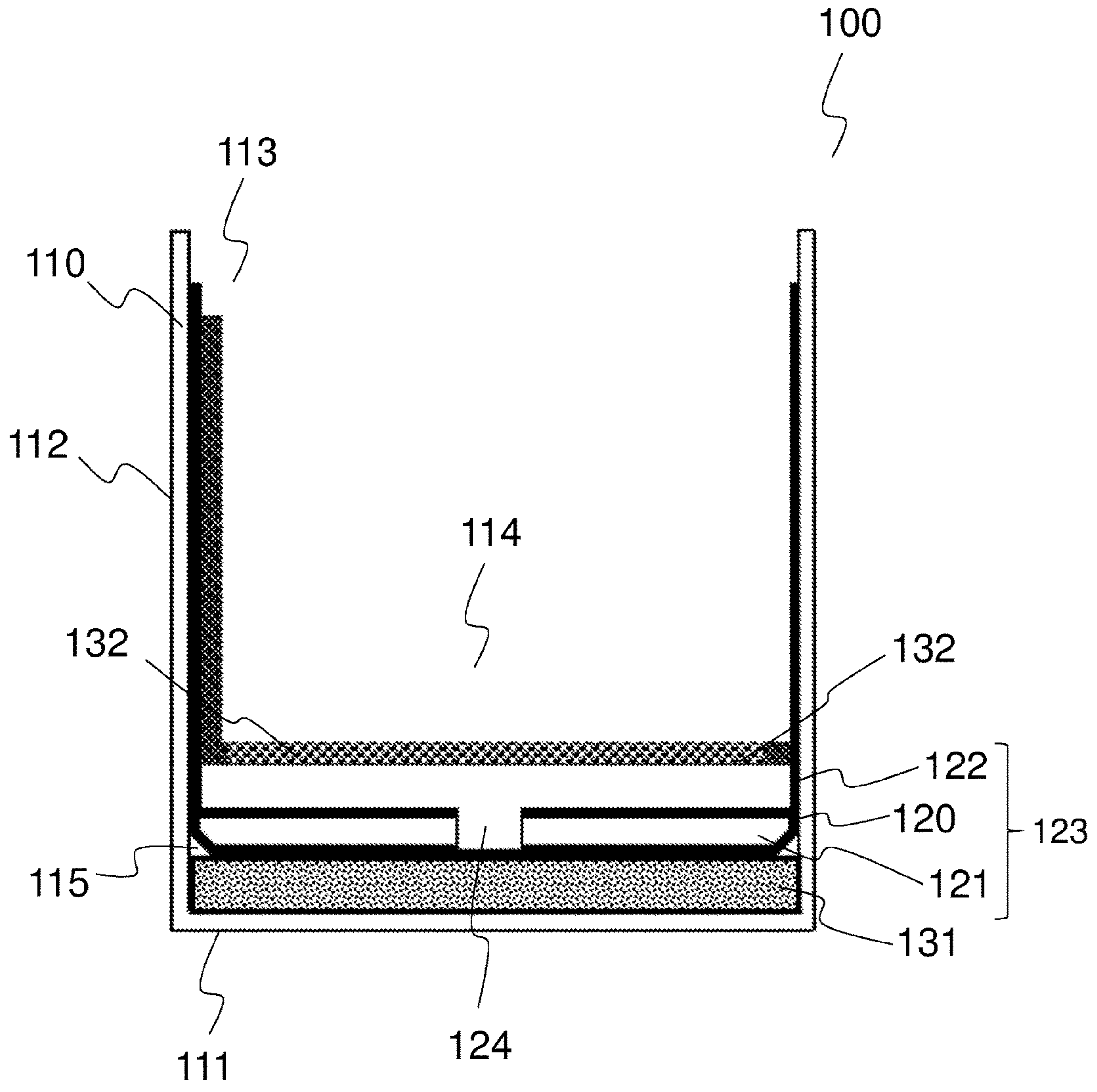
FIG. 1A shows a schematic side view of an energy storage device, according to various embodiments.

Embodiments described below in context of the apparatus are analogously valid for the respective method 300*s*, and vice versa. Furthermore, it will be understood that the embodiments described below may be combined, for example, a part of one embodiment may be combined with a part of another embodiment.

It should be understood that the terms “on”, “over”, “top”, “bottom”, “down”, “side”, “back”, “left”, “right”, “front”, “lateral”, “side”, “up”, “down”, etc., when used in the following description are used for convenience and to aid understanding of relative positions or directions, and not intended to limit the orientation of any device, or structure or any part of any device or structure. In addition, the singular terms “a”, “an”, and “the” include plural references unless context clearly indicates otherwise. Similarly, the word “or” is intended to include “and” unless the context clearly indicates otherwise.

Various embodiments generally relate to an energy storage device or system. The energy storage device according to various embodiments may involve or may be configured based on a reusable electrochemical cell design for aqueous-based energy storage devices. In particular, the energy storage device according to various embodiments may include an internal housing (e.g. an electrolyte-impermeable-barrier-member) which may function or may be configured as a reservoir for containing an electrolyte (e.g. an aqueous electrolyte). Further, said internal housing may be configured to allow or enable or cause the contained electrolyte to be channeled (e.g. within the energy storage device) to an anode (e.g. an electrode) of the energy storage device, while minimizing or preventing the electrolyte from direct contact with an external housing of the energy storage device receiving the internal housing within an internal space of the external housing. The internal housing of the energy storage device according to various embodiments may accordingly serve an essential or important role within the energy storage device, for example, by minimizing or preventing contact (e.g. direct or physical contact) of electrolyte (e.g. an aqueous-based electrolyte 240) with the external housing (e.g. a metallic external housing) of the energy storage device to prevent the electrolyte from corroding the external housing.

The internal housing of the energy storage device according to various embodiments may also be capable of containing or keeping or securing internal components of the energy storage device (e.g. components of the energy storage device housed or contained or placed within the internal housing) intact or within an internal space (e.g. of a receptacle structure) of the internal housing. Further, the internal housing may be detached or detachable (e.g. from the external housing) as a unit (e.g. together with the internal components) during disassembly of the energy storage device, for example, for inspection or maintenance of the energy storage device.

Various embodiments may also provide a locking and unlocking mechanism (e.g. a unique locking and unlocking mechanism) for the energy storage device. According to various embodiments, the locking and unlocking mechanism may be included in the energy storage device. According to various embodiments, the locking and unlocking mechanism may be a plug for closing an opening of the internal housing of the energy storage device. Specifically, the locking and unlocking mechanism may be a removable plug which may be configured to be removably coupled or releasably attached to the internal housing (e.g. to inner walls of the internal housing) of the energy storage device, according to various embodiments, thereby facilitating placement or removal of the plug with respect to the internal housing of the energy storage device, which may, in turn, facilitate (in other words, enable facile or ease of) assembly and/or disassembly of the energy storage device, for example, for components inspection, maintenance, replacement of components, and/or re-filling of the electrolyte, for improving service life and increasing reusability of the energy storage device. In other words, with the locking and unlocking mechanism according to various embodiments, the energy storage device according to various embodiments, which may be an electrochemical cell, can be easily assembled and/or disassembled, for instance, for parts inspection, maintenance, replacement of components, and/or re-filling of the electrolyte. This can result in longer service life and reusability of the energy storage device (e.g. cell), which can potentially reduce an amount of e-waste generated in contrast to a use of multiple or a higher number of conventional energy storage devices required for a similar application.

As an example, the plug (i.e. locking and unlocking mechanism) may resemble a cap with a flat (e.g. substantially flat) or a planar end on a first side (e.g. a first axial end surface, or bottom surface of the plug) and an inner screw-thread opposite the first side. During assembly of the energy storage device, to lock or secure components in place within the internal housing, the plug together with an external tool (e.g. an elongate structure, or a bottle, or a bottle-like tool), which may be configured to be removably coupled or releasably attached to the plug (e.g. via a threaded engagement or joint) for moving the plug via the external tool, may be inserted or slotted into the internal housing, and subsequently, the external tool may be separated from the plug and removed from the internal housing (e.g. by turning the external tool with respect to the plug in an anti-clockwise manner, e.g. when looking into the plug from the external tool).

Further, to remove the plug from within the internal housing during disassembly of the energy storage device, the external tool may be re-attached to the plug (e.g. by moving the external tool towards the plug and turning the external tool in a clockwise manner, e.g. when looking into the plug from the external tool), to couple the plug to the external tool (e.g. via a threaded engagement or joint) and extracting the plug out of the internal housing by moving the external tool with the plug attached thereto out and away from the internal housing.

Accordingly, the energy storage device according to various embodiments may be configured as a reusable cell (in other words, may be configured to be a reusable energy storage device) involving at least the internal housing (e.g. electrolyte-impermeable-barrier-member) and/or the locking and unlocking mechanism (e.g. plug).

Further, unlike conventional or state-of-art energy storage device (e.g. cell) designs, where conventional electrodes are typically rolled with a conventional separator and a conventional anode, which are then slotted into a conventional battery housing, which can potentially lead to cracking or delamination of the electrode (e.g. when a loading mass on the conventional electrode is relatively heavy/large or is increased during an application of the energy storage device), the energy storage device according to various embodiments, on the other hand, may include or may utilize one or more pelletized electrode(s) (e.g. pellet-shaped and/or pre-compressed electrodes) which may be capable or withstanding a higher loading mass than conventional electrodes and which can be easily placed into or removed from the internal housing of the energy storage device, thereby eliminating risk of electrode cracking and delamination which tend to occur with conventional energy storage devices.

FIG. 1A shows a schematic side view of an energy storage device 100, according to various embodiments.

According to various embodiments, the energy storage device 100 may include a housing 110. The housing 110 may be an exterior structure (e.g. an exterior or external or outer housing, an exterior or outer case, an exterior reservoir, etc.) which may define an internal space 113 to or for housing or containing or holding one or more various other components (e.g. internal components, other than the housing 110) of the energy storage device 100. In particular, the housing 110 may include a base portion 111 (e.g. a base, or a panel) and at least one side wall 112 (e.g. at least one other panel) extending from the base portion 111 of the housing 110. The base portion 111 and at least one side wall 112 of the housing 110 may together define the internal space 113 of the housing 110 to or for containing or holding the one or more various other components of the energy storage device 100.

According to various embodiments, the base portion 111 of the housing 110 may be a flat (e.g. substantially flat or planar) base portion 111. The at least one side wall 112 of the housing 110 may extend (e.g. perpendicularly, e.g. substantially perpendicularly, or non-perpendicularly) from the base portion 111 to form a receptacle structure of the housing 110 defining the internal space 113 to or for housing or containing or holding the one or more various other components of the energy storage device 100. As an example, according to various embodiments, the at least one side wall 112 of the housing 110 may include or may be a single curved and continuous side wall or panel. Accordingly, when the housing 110 includes the single curved and continuous side wall extending from the base portion 111 of the housing 110, the housing 110 may be of a cylindrical shape. The housing 110 may include an opening (e.g. open end) opposite the base portion 111. As another example, according to various other embodiments, the at least one side wall 112 of the housing 110 may include or may be a plurality of disparate side walls or panels which may be joined or connected, e.g. in an edge-to-edge manner, with each other, and may extend from the base portion 111 of the housing 110. Accordingly, when the housing 110 includes the plurality of disparate side walls or panels extending from the base portion 111 of the housing 110, the housing 110 may be of a triangular prism shape, or a rectangular prism shape, or a pentagonal prism shape, etc.

According to various embodiments, the housing 110 may include or may be made of a rigid (e.g. substantially rigid) material capable of withstanding a load or force (e.g. by one or more coil spring(s), i.e. battery contacts) exerted or acting on the housing 110 of the energy storage device 100. For example, the housing 110 may include or may be made of a rigid metal, a rigid alloy (e.g. Ni—Fe) material, etc.

According to various embodiments, the housing 110, which may be made of the metallic material (e.g. metal or alloy), may also include or possess a property (e.g. physical property) of being electrically conductive. Accordingly, according to various embodiments, the energy storage device 100, with the electrically conductive housing 110, may be capable of providing power (e.g. by converting stored energy into electrical energy) to or for powering an external electronic circuit or device or load. In particular, the housing 110, which may possess an electrically conductive property, may provide an electrical conduction pathway from an electrode (e.g. an anode, described later) of the energy storage device 100 to an external electronic circuit or device or load. Accordingly, according to various embodiments, the energy storage device 100 may be or configured or may serve or function as a battery, a cell, etc.

As shown in FIG. 1A, the energy storage device 100 may include (e.g. further include) a first electrode 131 and may include (e.g. further include) a second electrode 132. Each of the first electrode 131 and the second electrode 132 may include or may be a respective anode or a respective cathode. For example, the first electrode 131 may be an anode, and the second electrode 132 may be a cathode. For case of illustration, herein, the first electrode 131 may be described or referred to as an anode, while the second electrode 132 may be described or referred to as a cathode. Nevertheless, embodiments described herein as such are not limited as such.

According to various embodiments, the first electrode 131 (e.g. an anode) and the second electrode 132 (e.g. a cathode) may be disposed or may be disposable within the internal space 113 of the housing 110.

The energy storage device 100 may include an electrolyte 240 (see FIG. 2B) disposed within the internal space 113 of the housing 110 for interacting with the first electrode 131 and the second electrode 132 (e.g. disposed within the internal space 113 of the housing 110). In particular, the electrolyte 240 may serve as a medium for providing an ion transport mechanism between the first electrode 131 (e.g. an anode) and the second electrode 132 (e.g. a cathode). According, the electrolyte 240 may be or may include conducting ions. According to various embodiments, the electrolyte 240 may be in a form of a solution or fluid or liquid, in other words, may be an aqueous electrolyte, but is not limited thereto. Accordingly, as an example, when the electrolyte 240 is an aqueous electrolyte, the aqueous electrolyte 240 may include additives containing liquid solution and may optionally include co-solvent(s). According to various other embodiments, the electrolyte 240 may be a solid-state electrolyte.

Generally, the electrolyte 240 may be of a type which may be "corrosive" to the housing 110 (e.g. a metallic housing 110). In particular, the electrolyte 240 may be capable of triggering an electrolytic corrosion process on the housing 110 (e.g. metallic housing 110) when the electrolyte 240 comes into direct and/or physical contact with the housing 110.

Accordingly, according to various embodiments, the energy storage device 100 may include (e.g. further include) an electrolyte-impermeable-barrier-member 120 configured to or for protecting the housing 110 of the energy storage device 100 from corrosion from an electrolytic corrosion process involving the electrolyte 240. According to various embodiments, the electrolyte-impermeable-barrier-member 120 may be disposed within the internal space 113 of the housing 110 so as to or for shielding the housing 110 (e.g. a portion or most of or the entire housing 110, or one or more or all inner surface(s) of the housing 110) from direct and/or immediate contact (e.g. physical contact) with the electrolyte 240 (e.g. within the internal space 113 of the housing 110). In other words, according to various embodiments, the electrolyte-impermeable-barrier-member 120 may be configured to reduce or minimize or prevent contact (e.g. direct contact, immediate contact, and/or physical contact) between the electrolyte 240 and the housing 110 (e.g. within the internal space 113 of the housing 110). The electrolyte-impermeable-barrier-member 120 may include or may be made of (e.g. entirely of) one or more non-metallic material(s), such as a polypropylene material, which may be resistant to any corrosive effects from any electrolytic corrosion process involving the electrolyte 240. The electrolyte-impermeable-barrier-member 120 may also serve as a reservoir for containing one or more various components (e.g. at least some electrolyte 240, and/or at least the second electrode 132) of the energy storage device 100, while preventing or reducing an extent of the electrolyte 240 coming into direct and/or immediate contact with the electrolyte 240 (e.g. within the internal space 113 of the housing 110). Accordingly, the electrolyte-impermeable-barrier-member 120 may be an interior structure (e.g. an interior or internal or inner housing, an interior or inner case, an interior or internal reservoir, etc.) which may be disposed (e.g. disposable) within the housing 110 to prevent or minimize or reduce contact (e.g. direct and/or immediate contact) between the housing 110 and the electrolyte 240.

As shown, the electrolyte-impermeable-barrier-member 120 may include a base portion 121 (e.g. a base, or a panel) and may include (e.g. further include) at least one side wall 122 (e.g. at least one other panel) extending (e.g. perpendicularly, e.g. substantially perpendicularly, or non-perpendicularly) from the base portion 121 of the electrolyte-impermeable-barrier-member 120 to form a receptacle structure 123 of the electrolyte-impermeable-barrier-member 120. The base portion 121 of the electrolyte-impermeable-barrier-member 120 may be a substantially flat or planar base portion 121. The at least one side wall 122 of the electrolyte-impermeable-barrier-member 120 may include or may be a single curved and continuous side wall 122. Accordingly, when the at least one side wall 122 of the electrolyte-impermeable-barrier-member 120 includes or is the single curved and continuous side wall 122 extending from the base portion 121, the electrolyte-impermeable-barrier-member 120 may be of a cylindrical shape. According to various other embodiments, the at least one side wall 122 of the electrolyte-impermeable-barrier-member 120 may include or may be a plurality of disparate side walls or panels which may be joined or connected, e.g. in an edge-to-edge manner, with each other, and may extend from the base portion 121 of the electrolyte-impermeable-barrier-member 120. Accordingly, when the at least one side wall 122 of the electrolyte-impermeable-barrier-member 120 includes or is the plurality of disparate side walls or panels extending from the base portion 121, the electrolyte-impermeable-barrier-member 120 may be of a triangular prism shape, or a rectangular prism shape, or a pentagonal prism shape, etc.

According to various embodiments, the electrolyte-impermeable-barrier-member 120 may be disposed within the internal space 113 of the housing 110 in a manner so as to partition or compartmentalize or divide the internal space 113 of the housing 110 into (i) an intervening space 115 (in other words, a first compartment, e.g. a side or a lower compartment) that may be between the housing 110 and the electrolyte-impermeable-barrier-member 120 and into (ii) a receptacle space 114 (in other words, a second compartment, e.g. a second side or an upper compartment) which may be bound by the electrolyte-impermeable-barrier-member 120 (e.g. by the base portion 121 and the at least one side wall 122 of the receptacle structure 123 of the electrolyte-impermeable-barrier-member 120). For example, the receptacle space 114 may be bound by inner surfaces of the receptacle structure 123 of the electrolyte-impermeable-barrier-member 120, for example, a first surface (e.g. an inner or an upper surface of the base portion 121 of the receptacle structure 123) of the electrolyte-impermeable-barrier-member 120 and inner surface(s) (e.g. of the at least one side wall 122 of the receptacle structure 123) of the electrolyte-impermeable-barrier-member 120. The intervening space 115, on the other hand, may be bound by a second surface (e.g. an outer or a lower or bottom surface of the base portion 121 of the receptacle structure 123) of the electrolyte-impermeable-barrier-member 120 and by inner surface(s) (e.g. of the at least one side wall 112) of the housing 110.

The electrolyte-impermeable-barrier-member 120, or the receptacle structure 123 forming the electrolyte-impermeable-barrier-member 120, may define or may include at least one through-hole (e.g. one or more through-hole(s)) 124 which may serve as a channel or a conduit (e.g. for conveying a fluid, such as an aqueous electrolyte, therethrough) connecting (e.g. fluidly connecting) the receptacle space 114 and the intervening space 115 (e.g. when the electrolyte-impermeable-barrier-member 120 is disposed within the internal space 113 of the housing 110 in the manner so as to partition or compartmentalize or divide the internal space 113 of the housing 110 into the receptacle space 114 and the intervening space 115).

The first electrode 131 (e.g. an anode) may be disposed within or in the intervening space 115 (e.g. the first compartment) between the housing 110 and the electrolyte-impermeable-barrier-member 120. In other words, the intervening space 115 may be configured or dimensioned or sized to receive at least the first electrode 131.

The second electrode 132 (e.g. a cathode) may be disposed within or in the receptacle space 114 (e.g. the second compartment) within the electrolyte-impermeable-barrier-member 120. In other words, the receptacle structure 123 of the electrolyte-impermeable-barrier-member 120 may be configured or dimensioned or sized to receive at least the second electrode 132.

According to various embodiments, the first electrode 131 and the second electrode 132 may be respectively disposed or positioned on opposite sides of the at least one through-hole 124 defined by the receptacle structure 123 of the electrolyte-impermeable-barrier-member 120. In particular, the first electrode 131 and the second electrode 132 may be positioned opposite (e.g. directly opposite each other) with a respective surface of the electrolyte-impermeable-barrier-member 120 defining the at least one through-hole 124 separating (or sandwiched between) the first electrode 131 and the second electrode 132. Further, either one or both of the first electrode 131 and/or the second electrode 132 may be positioned along (in other words, coincide with) a corresponding or respective hole axis of the at least one through-hole 124 of the electrolyte-impermeable-barrier-member 120. For example, the first electrode 131 and/or the second electrode 132 may be positioned adjacent (e.g. immediate adjacent to) a corresponding opening of the at least one through-hole 124 of the electrolyte-impermeable-barrier-member 120.

According to various embodiments, the electrolyte 240 (e.g. at least a portion of the electrolyte 240) may be disposed within at least the receptacle structure 123 of the electrolyte-impermeable-barrier or within the receptacle space 114, and may further be disposed within the internal space 113 of the housing 110 or within the intervening space 115, in a manner so as to interact with the first electrode 131 and the second electrode 132 (e.g. which may be on opposites sides of a surface or portion or wall of the receptacle structure 123 of the electrolyte-impermeable-barrier). In particular, according to various embodiments, the electrolyte 240 may be disposed with respect to the electrolyte-impermeable-barrier-member 120 (e.g. which may be disposed within the internal space 113 of the housing 110) in a manner so as to be shielded by the electrolyte-impermeable-barrier-member 120 from direct or immediate contact with the housing 110 (e.g. at least some, most or more than half, or all of the housing 110, e.g. at least some, most or more than half, or all internal surface(s) of the housing 110), while the electrolyte 240 interacts or is able to interact with the second electrode 132 within the receptacle space 114 (i.e. second or upper compartment) and reaches or is able to reach or extend through the at least one through-hole 124 of the electrolyte-impermeable-barrier-member 120 to interact with the first electrode 131 within the intervening space 115 (i.e. first or lower compartment). Accordingly, the electrolyte-impermeable-barrier-member 120 may control or direct or dictate or create a path or pathway (e.g. specific or predetermined path or pathway) of or for the electrolyte 240 within the energy storage device 100 (e.g. within the internal space 113 of the housing 110 and/or the receptacle structure 123 of the electrolyte-impermeable-barrier-member 120 of the energy storage device 100), by way of at least the at least one through-hole 124 of the electrolyte-impermeable-barrier-member 120 defined and/or positioned and/or arranged and/or disposed in a specific or predetermined manner (e.g. position) on or along the receptacle structure 123 of the electrolyte-impermeable-barrier-member 120, to or for causing the electrolyte 240 within the energy storage device 100 to reach along the path or pathway (e.g. specific or predetermined path or pathway) while minimizing or without direct or immediate contact (e.g. physical contact) between the electrolyte 240 and the housing 110. In particular, the electrolyte 240 may reach from or extend from either one of the intervening space 115 (i.e. first compartment) or the receptacle space 114 (i.e. second compartment) to the other one of the receptacle space 114 or the intervening space 115, via (e.g. via only) the at least one through-hole 124 of the electrolyte-impermeable-barrier-member 120, so as reduce or minimize or not come into direct or immediate contact (e.g. physical contact) with the housing 110 of the energy storage device 100.

According to various embodiments, the electrolyte-impermeable-barrier-member 120 and the housing 110 may be aligned in a coaxial (or substantially co-axial) manner with respect to each other, for instance, when both the electrolyte-impermeable-barrier-member 120 and the housing 110 are of a same or similar shape (e.g. cylindrical shape) or when a shape (or lateral cross-section of the shape) of the housing 110 is larger than a shape (or lateral cross-section of the shape) of the receptacle structure 123 of the electrolyte-impermeable-barrier-member 120. For example, within a coaxial arrangement of the electrolyte-impermeable-barrier-member 120 and the housing 110, a longitudinal axis of the electrolyte-impermeable-barrier-member 120 and a longitudinal axis of the housing 110 may coincide (or may be parallel but not coinciding) with each other. As such, according to various embodiments, the electrolyte-impermeable-barrier-member 120 may be telescopically disposed (or disposable) or received (or receivable) within the internal space 113 of the housing 110. According to various other embodiments, the electrolyte-impermeable-barrier-member 120 and the housing 110 may be arranged in any other suitable manner with respect to each other. For example, according to various other embodiments, the electrolyte-impermeable-barrier-member 120 and the housing 110 may be aligned in a non-coaxial manner (or may not be aligned coaxially) with respect to each other.

According to various embodiments, the at least one through-hole (e.g. one or more through-hole(s)) 124 of the receptacle structure 123 of the electrolyte-impermeable-barrier-member 120 may be at or may be defined at the base portion 121 of the receptacle structure 123 of the electrolyte-impermeable-barrier-member 120. According to various embodiments, the at least one through-hole 124 at the base portion 121 of the electrolyte-impermeable-barrier-member 120 may be a single through-hole which may be positioned or disposed at a center or a middle of the base portion 121 of the electrolyte-impermeable-barrier-member 120, or may be a plurality of through-holes which may be positioned or disposed at a center region or middle region of the base portion 121 of the electrolyte-impermeable-barrier-member 120. According to various other embodiments, the at least one through-hole 124 at the base portion 121 of the electrolyte-impermeable-barrier-member 120 may be offset from a center or center region of the base portion 121 of the electrolyte-impermeable-barrier-member 120.

According to various embodiments, a size (e.g. diameter, width, etc.) of each of the at least one through-hole 124 at the base portion 121 of the electrolyte-impermeable-barrier-member 120 may be smaller than a size (e.g. diameter, width, etc.) of the first electrode 131 and/or of the second electrode 132 so as to or for preventing the electrolyte 240 from seeping or leaking through the at least one through-hole 124 to come into contact with the housing 110 without being blocked by the first electrode 131. In other words, the first electrode 131 may be sized to fully cover the at least one through-hole 124 at the base portion 121 of the electrolyte-impermeable-barrier-member 120 such that the electrolyte 240 reaching through the at least one through-hole 124 from the receptacle space 114 of the electrolyte-impermeable-barrier-member 120 may come into contact (e.g. a first or an initial contact) with the first electrode 131 without being in contact with the housing 110.

Further, according to various embodiments, the at least one side wall 122 of the electrolyte-impermeable-barrier-member 120 may be completely free from or without any through-hole extending therethrough.

As shown in FIG. 1A, the electrolyte-impermeable-barrier-member 120 may be disposed within the internal space 113 of the housing 110, and may be oriented with the at least one side wall 122 of the electrolyte-impermeable-barrier-member 120 aligned to the at least one side wall 112 of the housing 110. In other words, the at least one side wall 122 of the electrolyte-impermeable-barrier-member 120 may extend along a same (e.g. substantially same) direction as the at least one side wall 112 of the housing 110. Accordingly, when the at least one through-hole 124 of the electrolyte-impermeable-barrier-member 120 is at the base portion 121 of the electrolyte-impermeable-barrier-member 120, with the at least one side wall 122 of the electrolyte-impermeable-barrier-member 120 being completely free from and without any through-hole extending therethrough, the electrolyte 240 may be disposed with respect to the electrolyte-impermeable-barrier-member 120 in a manner such that the at least one side wall 122 of the electrolyte-impermeable-barrier-member 120 shields or is able to shield the electrolyte 240 from the at least one side wall 112 of the housing 110. Thus, for example, when the energy storage device 100 is in an upright orientation (e.g. with the base portion 111 of the housing 110 placed on an external ground), the electrolyte 240 may be disposed within at least the receptacle structure 123 of the electrolyte-impermeable-barrier-member 120 together with the second electrode 132 and, consequently, the electrolyte 240 (e.g. at least a partial portion of the electrolyte 240) may reach or extend towards and/or through the at least one through-hole 124 at the base portion 121 of the receptacle structure 123 of the electrolyte-impermeable-barrier-member 120 to further interact with the first electrode 131 on an opposite side of the base portion 121 of the receptacle structure 123 of the electrolyte-impermeable-barrier-member 120, with minimal or without the electrolyte 240 contacting (e.g. directly contacting, immediately contacting, and/or physically contacting) the at least one side wall 112 of the housing 110 and/or the base portion 111 of the housing 110. Hence, according to various embodiments, the at least one side wall 122 of the receptacle structure 123 of the electrolyte-impermeable-barrier-member 120, may function as a barricade or a shield.

Accordingly, as described herein, the electrolyte-impermeable-barrier-member 120 may act or may function or may serve as an "internal reservoir" to or for holding at least the electrolyte 240 (e.g. at least some electrolyte 240), and may include an opening (i.e. the at least one through-hole 124) to or for channeling or directing the electrolyte 240 to an electrode (e.g. an anode). In particular, the electrolyte-impermeable-barrier-member 120 may keep or hold or contain at least some or a bulk of the electrolyte 240 within the receptacle structure 123 of the electrolyte-impermeable-barrier-member 120, while enabling the electrolyte 240 to interact with the first electrode 131 and the second electrode 132 on opposite sides of the receptacle structure 123 of the electrolyte-impermeable-barrier-member 120, while minimizing or preventing contact (e.g. direct or immediate physical contact) between the electrolyte 240 and the housing 110.

According to various embodiments, either one or both of the first electrode 131 and/or the second electrode 132 may be a pellet or pelletized electrode. In other words, the first electrode 131 and/or the second electrode 132 may include or may be pellet-shaped or disked-shaped or cylindrical-shaped. As an example, the first electrode 131 may be composed of any one or more of metallic foil, Zinc (Zn), Aluminum (Al), Potassium (K), Magnesium (Mg), or any other electrochemically active material(s), which may be pressed or compressed (e.g. pre-compressed) to form the pellet-shaped first electrode 131. The second electrode 132 may be composed of same or different (e.g. same or different composition of) electrochemically active material(s) as or from the first electrode 131, and may, likewise as the first electrode 131, be pressed or compressed (e.g. pre-compressed) to form a pellet-shaped or disked-shaped or cylindrical-shaped second electrode 132. The pellet-shaped first electrode 131 and/or the pellet-shaped second electrode 132, being compressed (or pre-compressed) (e.g. axially), may be capable of withstanding a relatively high or higher load (e.g. axial load) or loading mass acting thereon, thereby enabling or allowing the first electrode 131 and/or the second electrode 132 to be stacked on and/or over one another, and/or have one or more various other components of the energy storage device 100 stacked thereon the first electrode 131 and/or the second electrode 132.

As shown in FIG. 1A, according to various embodiments, the base portion 121 of the electrolyte-impermeable-barrier-member 120 may be stacked (e.g. stacked directly, or stacked indirectly) on and/or over the first electrode 131. The first electrode 131 may be larger in size than the at least one through-hole 124 which may be at the base portion 121 of the electrolyte-impermeable-barrier-member 120, such that the at least one through-hole 124 at the base portion 121 of the electrolyte-impermeable-barrier-member 120 may be covered (e.g. entirely covered) or blocked by the first electrode 131.

The first electrode 131 may, in turn, be stacked on and/or over the base portion 111 of the housing 110 that may receive the electrolyte-impermeable-barrier-member 120 therewithin its internal space 113.

Accordingly, the base portion 121 of the electrolyte-impermeable-barrier-member 120 may be over the base portion 111 of the housing 110, with the first electrode 131 sandwiched therebetween (e.g. directly or indirectly therebetween).

Further, as shown, according to various embodiments, the second electrode 132 may be disposed within the receptacle structure 123 of the electrolyte-impermeable-barrier-member 120 and above or over the base portion 121 of the receptacle structure 123 of the electrolyte-impermeable-barrier-member 120. In other words, the second electrode 132 may be stacked on and/or over the first electrode 131, with the base portion 121 of the electrolyte-impermeable-barrier-member 120 (e.g. defining the at least one through-hole 124) sandwiched between (e.g. directly or indirectly between) the first electrode 131 and the second electrode 132. The first electrode 131 and the second electrode 132 may accordingly be spaced apart or separated from each other via at least the intervening base portion 121 of the receptacle structure 123 of the electrolyte-impermeable-barrier-member 120, thereby circumventing or minimizing any risk of internal shorting of components (e.g. the first electrode 131 and the second electrode 132) within the energy storage device 100 (e.g. a battery, a cell, etc.) which may otherwise occur, for example, if the first electrode 131 and the second electrode 132 were to come into direct or physical contact with each other within the energy storage device 100.

Accordingly, as described, according to various embodiments, the first electrode 131, the second electrode 132, and the base portion 121 of the receptacle structure 123 of the electrolyte-impermeable-barrier-member 120 (e.g. between the first electrode 131 and the second electrode 132) may be arranged or positioned or disposed or stacked along a straight (e.g. substantially straight) line or along a longitudinal axis of the energy storage device 100 [N.B. the longitudinal axis of the energy storage device 100 may coincide, or substantially coincide, e.g. may be parallel but not coinciding, with the longitudinal axis of the housing 110]. According to various embodiments, the longitudinal axis of the energy storage device 100 may coincide (e.g. substantially coincide) with a hole axis of the at least one through-hole 124 (e.g. at the base portion 121) of the electrolyte-impermeable-barrier-member 120.

According to various embodiments, the electrolyte-impermeable-barrier-member 120 (e.g. an internal housing) may facilitate disassembly of the energy storage device 100 for maintenance and/or replacement and/or inspection of one or more various components of the energy storage device 100. For example, the electrolyte-impermeable-barrier-member 120 (e.g. internal housing), containing at least the second electrode 132 within the receptacle structure 123 of the electrolyte-impermeable-barrier-member 120, may be detached or removed or moved away from the internal space 113 of the housing 110 (e.g. an external housing, which may contain the first electrode 131 within the intervening space 115 between the housing 110 and the electrolyte-impermeable-barrier-member 120) so as to disassemble the energy storage device 100. For example, when the electrolyte-impermeable-barrier-member 120 is disposed within the internal space 113 of the housing 110, the electrolyte-impermeable-barrier-member 120 may be lifted, for example, by the at least one side wall 122 of the receptacle structure 123 of the electrolyte-impermeable-barrier-member 120, away from the internal space 113 of the housing 110 to detach the electrolyte-impermeable-barrier-member 120 from the housing 110.

Accordingly, the electrolyte-impermeable-barrier-member 120 may serve as an internal housing or internal case for holding or containing various internal components (e.g. at least the second electrode 132, and/or at least an "electrolyte-permeable-member 150" described later with reference to FIG. 1B) of the energy storage device 100, and may be easily or readily detachable or disassembled from the housing 110 (i.e. an external housing or external case), for disassembling the energy storage device 100 to permit maintenance and/or replacement and/or inspection of one or more various components of the energy storage device 100. In other words, the electrolyte-impermeable-barrier-member 120, which may serve as the internal housing, may keep various internal components of the energy storage device 100 intact (e.g. by urging against the internal components), while being detachable (e.g. from the housing 110) as a unit (e.g. single unit) during disassembly (e.g. of the energy storage device 100) for maintenance and/or inspection purposes of the energy storage device 100.

Figure 1B:
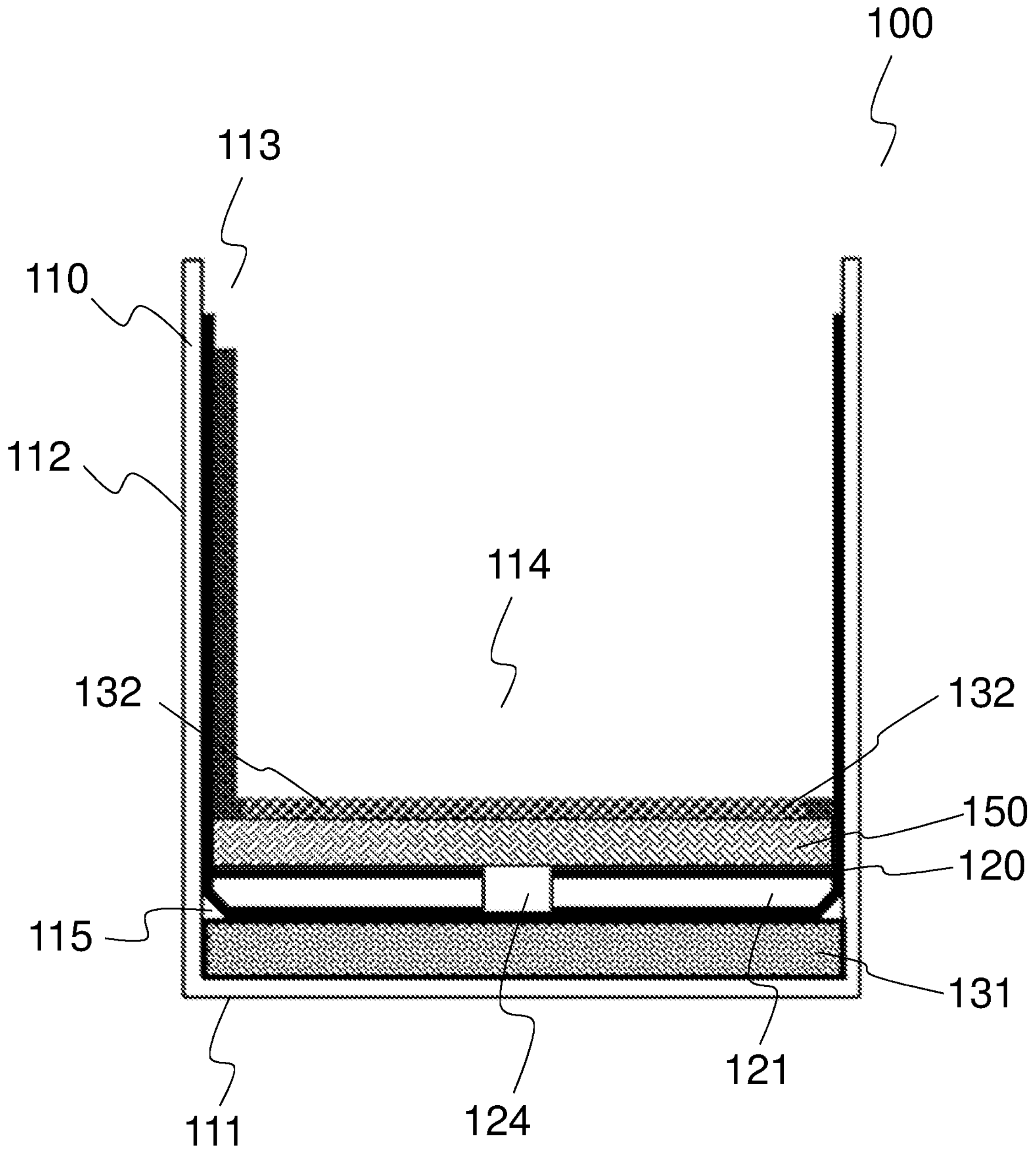
FIG. 1B shows a schematic side view of the energy storage device of FIG. 1A with an electrolyte-permeable-member of the energy storage device, according to various embodiments.

FIG. 1B shows a schematic side view of the energy storage device 100 of FIG. 1A with the electrolyte-permeable-member 150 of the energy storage device 100, according to various embodiments.

As shown, according to various embodiments, the energy storage device 100 may include (e.g. further include) the electrolyte-permeable-member 150. The electrolyte-permeable-member 150 may be a separator for the energy storage device 100 (e.g. a battery, a cell, etc.), which may be configured to separate (e.g. further separate) the first electrode 131 and the second electrode 132. In other words, the electrolyte-permeable-member 150 (e.g. in addition to the intervening base portion 121 of the electrolyte-impermeable-barrier-member 120, as described earlier) may be configured to prevent contact (e.g. direct contact or physical contact) between first electrode 131 and the second electrode 132, so as to prevent or minimize risk of shorting between the first electrode 131 and the second electrode 132.

According to various embodiments, the electrolyte-permeable-member 150 (e.g. separator, or battery separator) may also be configured to facilitate ion (e.g. Li ion) transport (e.g. with aid of the electrolyte 240) within the energy storage device 100 (e.g. battery, cell, etc.). For example, the electrolyte-permeable-member 150 may be a porous structure or porous membrane which may enable or may be suitable for the electrolyte 240 (e.g. an aqueous electrolyte 240) to be absorbed thereon and/or to reach or extend therethrough the porous electrolyte-permeable-member 150. For example, according to various embodiments, the electrolyte-permeable-member 150 may be configured as and/or may include or be made of an absorbent structure and/or absorbent material. For example, the electrolyte-permeable-member 150 may be a polymeric membrane with at least one pore (e.g. opening, e.g. through which fluid may pass), which may enable the electrolyte-permeable-member 150 to be capable of being moistened with the electrolyte 240 (e.g. an aqueous electrolyte 240). Accordingly, the electrolyte-permeable-member 150 (e.g. a polymeric membrane), when moistened with the electrolyte 240, may form or may be a catalyst capable of promoting movement of ions from the first electrode 131 to the second electrode 132, or vice versa (e.g. from the second electrode 132 to the first electrode 131), for example, with the aid of the electrolyte 240. Accordingly, according to various embodiments, the electrolyte-permeable-member 150 may be or may become conductive for ions (e.g. when soaked within the electrolyte 240).

Thus, as shown, according to various embodiments, the electrolyte-permeable-member 150 (e.g. separator) may be disposed within the internal space 113 of the housing 110, in particular, within the receptacle structure 123 of the electrolyte-impermeable-barrier-member 120. The electrolyte-permeable-member 150 may cover (e.g. directly cover) over the at least one through-hole 124 of the electrolyte-impermeable-barrier-member 120 from within the electrolyte-impermeable-barrier-member 120. According to various embodiments, the electrolyte-permeable-member 150 may be in direct contact with an inner surface (e.g. inner or an upper surface of the base portion 121 of the receptacle structure 123 defining the at least one through-hole 124) of the electrolyte-impermeable-barrier-member 120. For example, the electrolyte-permeable-member 150 (e.g. separator) may be flush with the inner surface (e.g. base portion 121 of the receptacle structure 123) of the electrolyte-impermeable-barrier-member 120. Further, according to various embodiments, a size (e.g. diameter, or average diameter, or lateral cross-sectional area, etc.) of the electrolyte-permeable-member 150 (e.g. separator) may be larger than a size (e.g. diameter, or average diameter, or lateral cross-sectional area, etc.) of each or all of the at least one through-hole 124 of the electrolyte-impermeable-barrier-member 120, so as to be capable of covering the at least one through-hole 124 of the electrolyte-impermeable-barrier-member 120. Further, the electrolyte-permeable-member 150 (e.g. separator) may have at least one pore (e.g. opening, e.g. through which fluid may pass), each of which may have a respective size (e.g. hole diameter) that may be smaller than a respective size (e.g. hole diameter) of each of the at least one through-hole 124 of the electrolyte-impermeable-barrier-member 120.

According to various embodiments, the electrolyte-permeable-member 150 may be sized to cover over at least some, or most, or an entire inner surface (e.g. entire inner surface of the base portion 121 of the receptacle structure 123 defining the at least one through-hole 124) of the electrolyte-impermeable-barrier-member 120.

Accordingly, for example, when the electrolyte-impermeable-barrier-member 120 is of a cylindrical shape (e.g. with a circular-shaped base portion 121), the electrolyte-permeable-member 150 (e.g. separator) may be a circular-shaped or disk-shaped electrolyte-permeable-member 150 or separator (e.g. sized to cover or rest on the circular-shaped base portion 121).

Figure 1C:
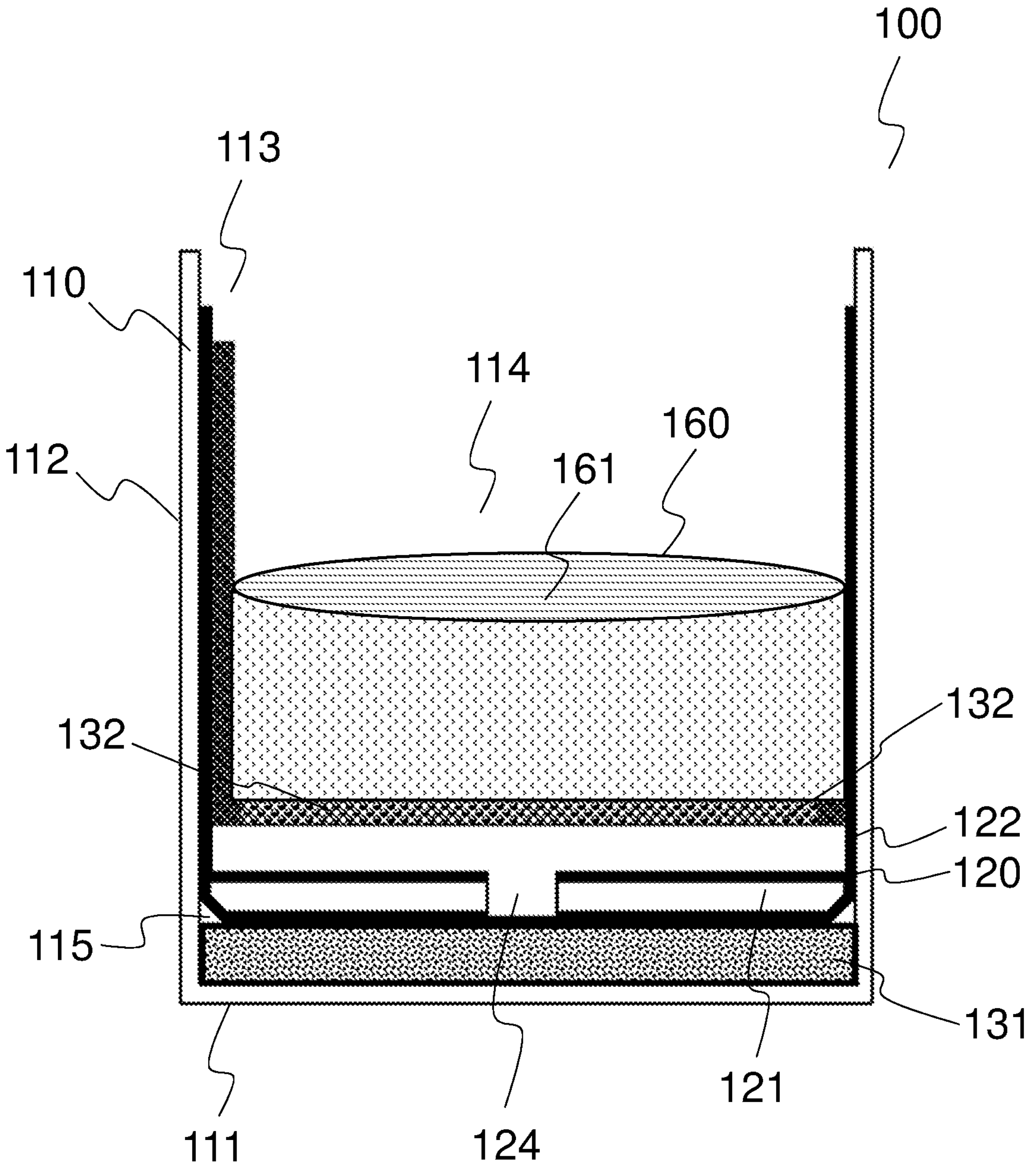
FIG. 1C shows a plug for removably attaching to an opening of an electrolyte-impermeable-barrier-member of the energy storage device of FIG. 1A, according to various embodiments.

FIG. 1C shows a plug 160 for removably attaching to an opening of the electrolyte-impermeable-barrier-member 120 of the energy storage device 100 of FIG. 1A.

According to various embodiments, there may be provided the plug 160 for the energy storage device 100 (or may be configured for any conventional energy storage device) for encasing and/or holding or securing one or more various components (e.g. at least the second electrode 132, and/or at least the electrolyte-permeable-member 150, and/or at least a part of the electrode, etc.) of the energy storage device 100 within the energy storage device 100. According to various embodiments, the plug 160 may be included (in other words, may be part of) the energy storage device 100. According to various embodiments, the plug 160 may be configured to be removably attachable to an opening (e.g. opposite the base portion 121, which may define the at least one through-hole 124) of the receptacle structure 123 of the electrolyte-permeable-member 150. Accordingly, the plug 160 may be configured as a removable or detachable plug 160 for the electrolyte-permeable-member 150. In particular, as shown, the plug 160 may be removably attached to the opening of the receptacle structure 123 of the electrolyte-impermeable-barrier-member 120 (e.g. opposite the base portion 121 of the electrolyte-impermeable-barrier-member 120) to close the electrolyte-impermeable-barrier-member 120 so as to encase and/or hold and/or secure one or more various components (e.g. at least the second electrode 132, and/or at least the electrolyte-permeable-member 150, and/or at least a part of the electrode, etc.) of the energy storage device 100 within the receptacle structure 123 of the electrolyte-permeable-member 150 of the energy storage device 100. Accordingly, the plug 160 may enable good contact of internal components (e.g. at least the second electrode 132, and/or at least the electrolyte-permeable-member 150, and/or at least a part of the electrode, etc.) by holding such internal components in place (e.g. in a stacked or a side-by-side manner between the plug 160 and an opposite surface, e.g. base portion 121, of the receptacle structure 123 of the electrolyte-permeable-member 150 of the energy storage device 100).

According to various embodiments, the plug 160 may include an engagement element configured to engage a corresponding engagement element (e.g. at the at least one side wall 122) of the electrolyte-impermeable-barrier-member 120 configured to or for removable attachment of the plug 160 to the electrolyte-impermeable-barrier-member 120. For example, the engagement element of the plug 160 and the corresponding engagement element of the electrolyte-impermeable-barrier-member 120 may be engaged to each other via a snap-fit engagement, a press-fit engagement, a friction-fit engagement, a magnetic engagement, or a ferromagnetic engagement element, or a threaded engagement (e.g. via external thread(s) along the plug 160 and internal thread(s) along the at least one side wall 122), or any other suitable engagement. Thus, the engagement element of the plug 160 and the corresponding engagement element of the electrolyte-impermeable-barrier-member 120 may include or may be any suitable type of fastener or engagement element.

Further, the plug 160 may be sized and/or shaped to form a seal (e.g. an air-tight or fluid-tight seal) with the at least one side wall 122 of the electrolyte-impermeable-barrier-member 120 so as to or for preventing at least the electrolyte 240, which may be an aqueous electrolyte, from escaping or leaking from the opening (e.g. opposite the base portion 121) of the electrolyte-impermeable-barrier-member 120 (e.g. when the energy storage device 100 is moved or is in an upside down orientation).

Accordingly, according to various embodiments, the plug 160 may include or be made of a material which may be resistant to corrosion by the electrolyte 240 (e.g. which may be caused by an electrolytic corrosion process involving the electrolyte 240). For example, the plug 160 may include or may be made of (e.g. entirely of) one or more non-metallic material(s), such as a polypropylene material.

Figure 1D:
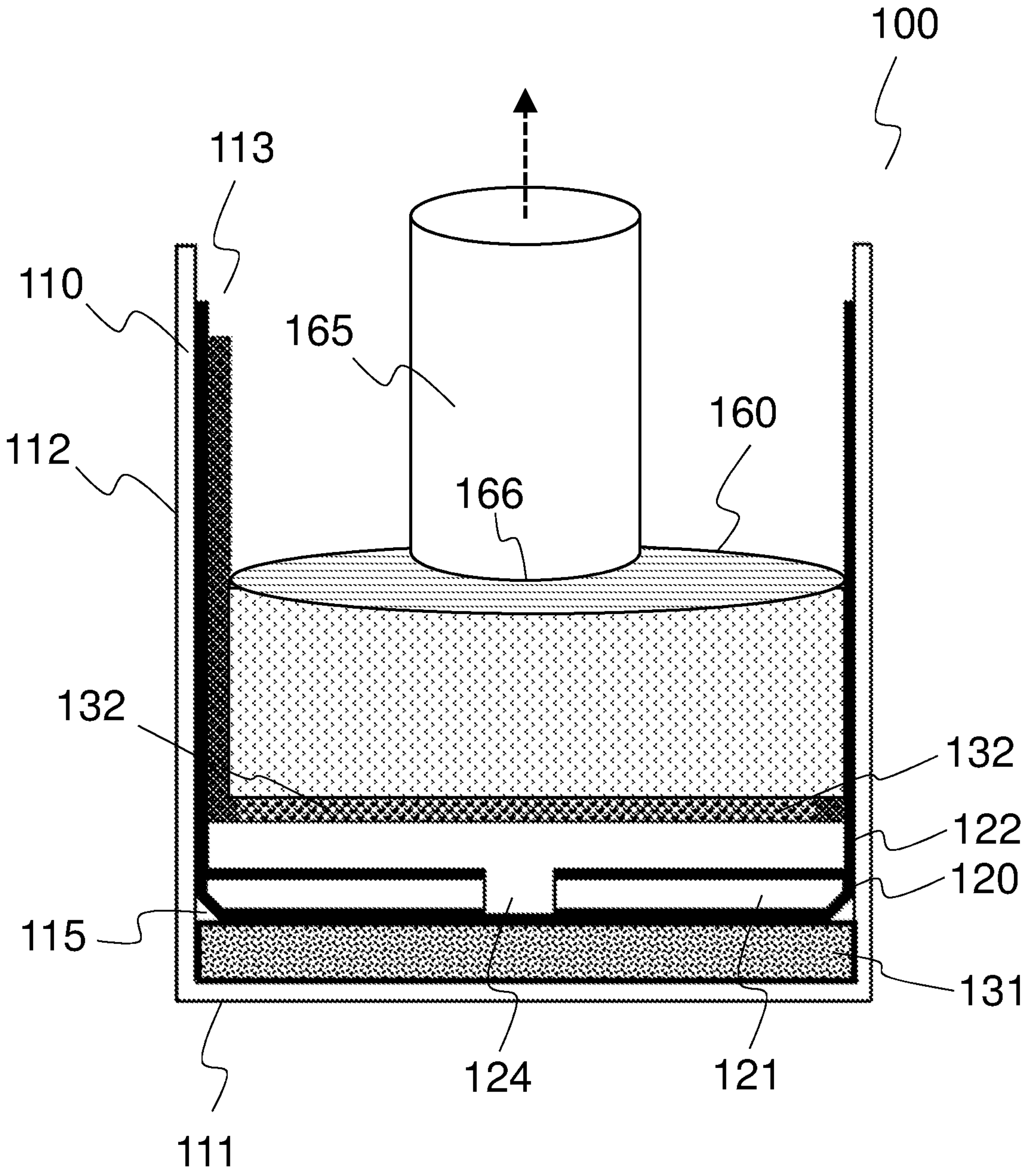
FIG. 1D and FIG. 1E show various schematic side views of the plug and an external tool for moving the plug with respect to the electrolyte-impermeable-barrier-member of the energy storage device of FIG. 1A, according to various embodiments.
Figure 1E:
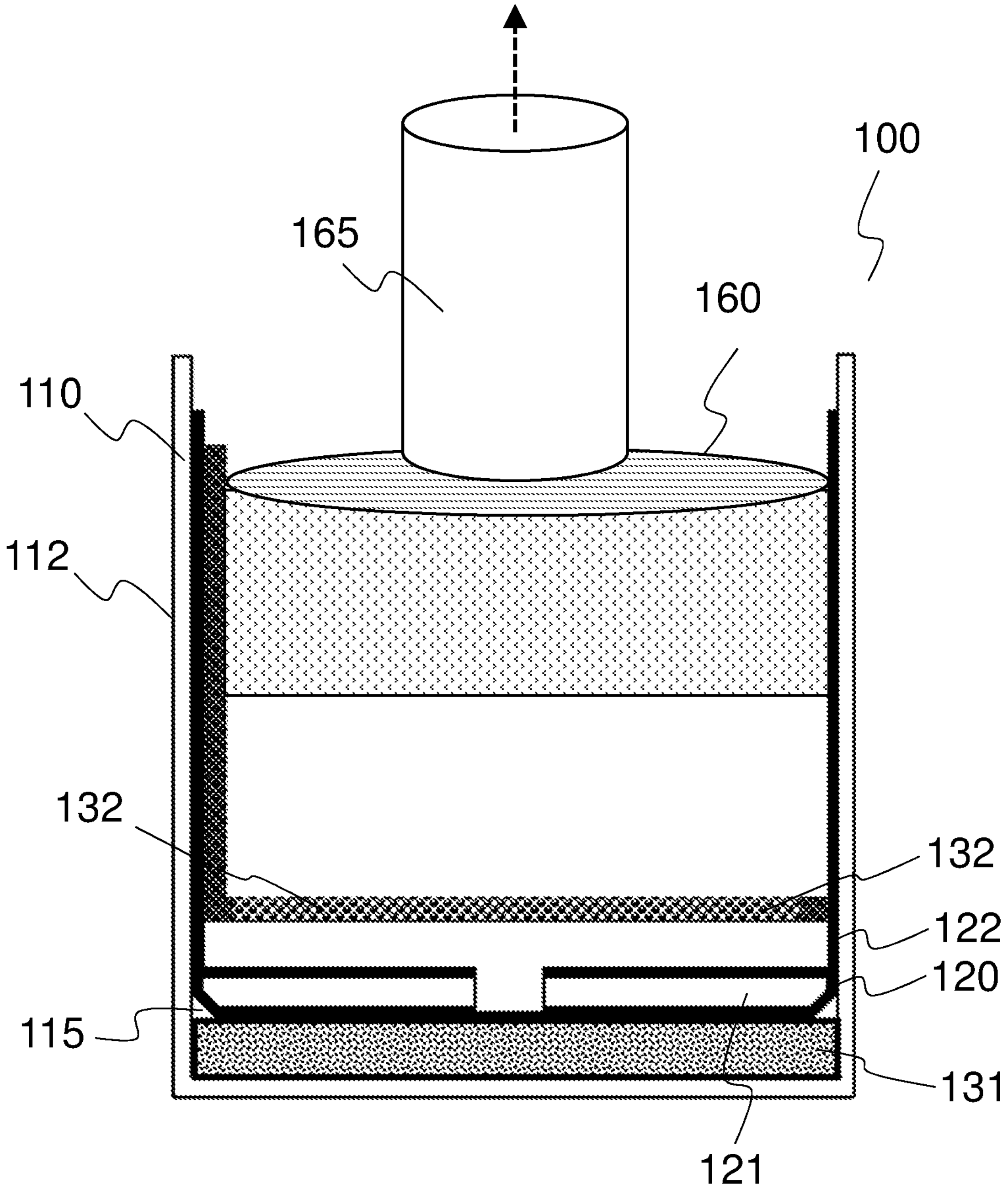

FIG. 1D and FIG. 1E show various schematic side views of the plug 160 and an external tool 165 for moving the plug 160 with respect to the electrolyte-impermeable-barrier-member 120 of the energy storage device 100, according to various embodiments.

According to various embodiments, there may be provided the external tool 165 configured to be removably coupled or releasably attached to the plug 160 for moving the plug 160 via the external tool 165. The external tool 165 may be a rigid (e.g. substantially rigid) elongated structure, for example, a rod or rod-like member, a cylindrical structure, a bottle or bottle-like structure, an extension member, an arm, etc. which may be attachable to the plug 160 at one end (e.g. a first end) of the external tool 165.

According to various embodiments, the plug 160 may include an auxiliary engagement element 161. The auxiliary engagement element 161 of the plug 160 may be configured to removably couple or releasably attach with the external tool 165 (e.g. at the first end of the external tool 165, e.g. via a corresponding auxiliary engagement element 166 of the external tool 165 at the first end of the external tool 165) in a manner so as to move the plug 160 using the external tool 165 (e.g. via a second opposite end or end region of the external tool 165 which may serve or be configured as a handle of the external tool 165). As such, the plug 160 and the external tool 165 may be configured in a manner so as to be removably couplable or releasably attachable to each other at one end of the external tool 165, with another opposite end of the external tool 165 configurable as a handle for moving the external tool 165 together with the plug 160 attached thereto. According to various embodiments, the external tool 165 may be configured to or may be for (i) placing the plug 160 within the receptacle structure 123 of the electrolyte-impermeable-barrier-member 120 and/or (ii) engaging the engagement element of the plug 160 with the corresponding engagement element of the electrolyte-impermeable-barrier-member 120 and/or (iii) disengaging the engagement element of the plug 160 from the corresponding engagement element of the electrolyte-impermeable-barrier-member 120 to or for removing the plug 160 from the electrolyte-impermeable-barrier-member 120.

According to various embodiments, the auxiliary engagement element 161 of the plug 160 and the corresponding auxiliary engagement element 166 of the external tool 165 may be removably coupled or releasably attached to each other via any suitable type of fastener or engagement element, such as a snap-fit engagement, a press-fit engagement, a friction-fit engagement, a magnetic engagement, or a ferromagnetic engagement element, or a threaded engagement, etc.

Figure 2A:
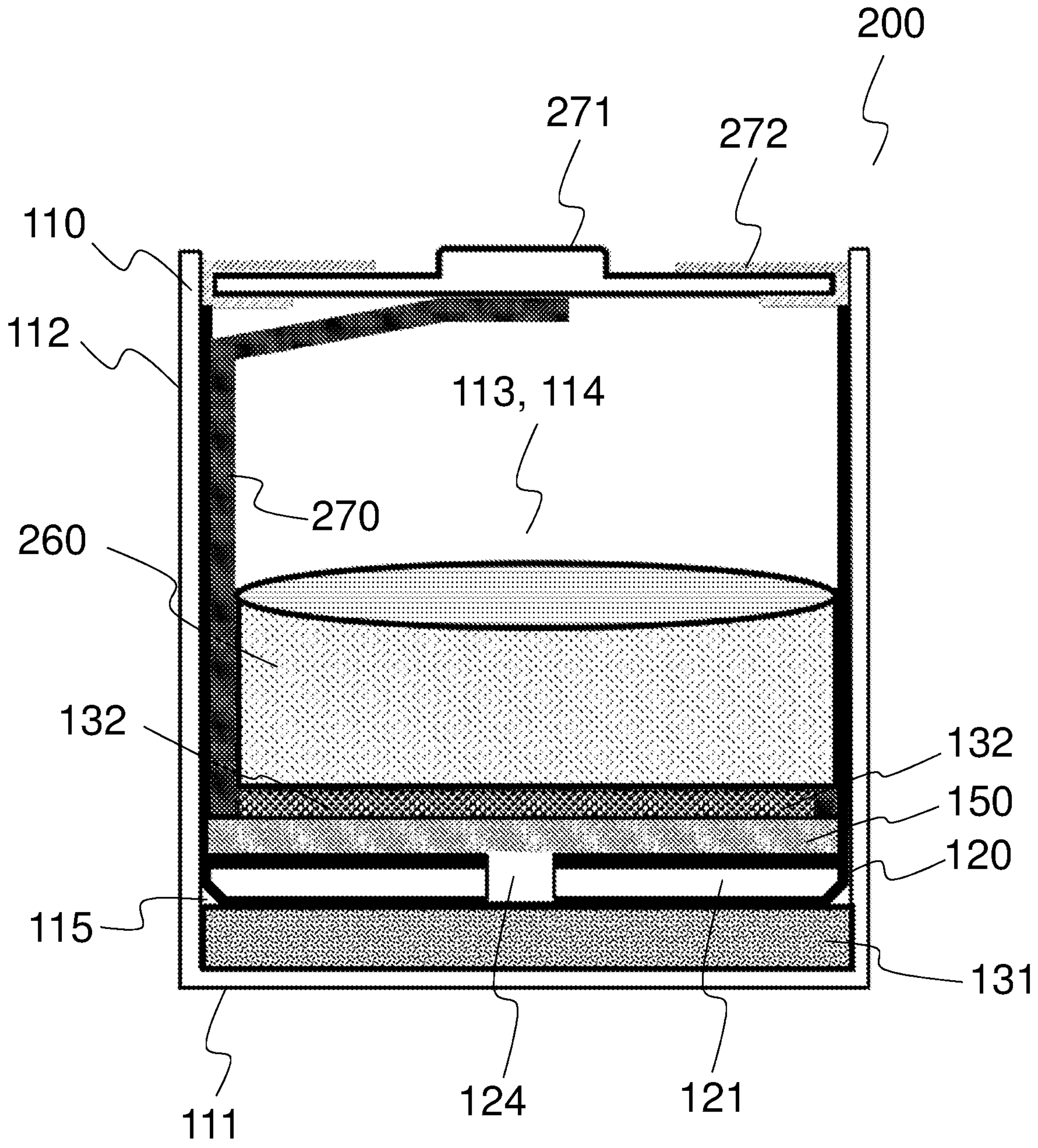
FIG. 2A and FIG. 2B show a schematic side view of an energy storage device which includes a current collector and a cap member, according to various embodiments.
Figure 2B:
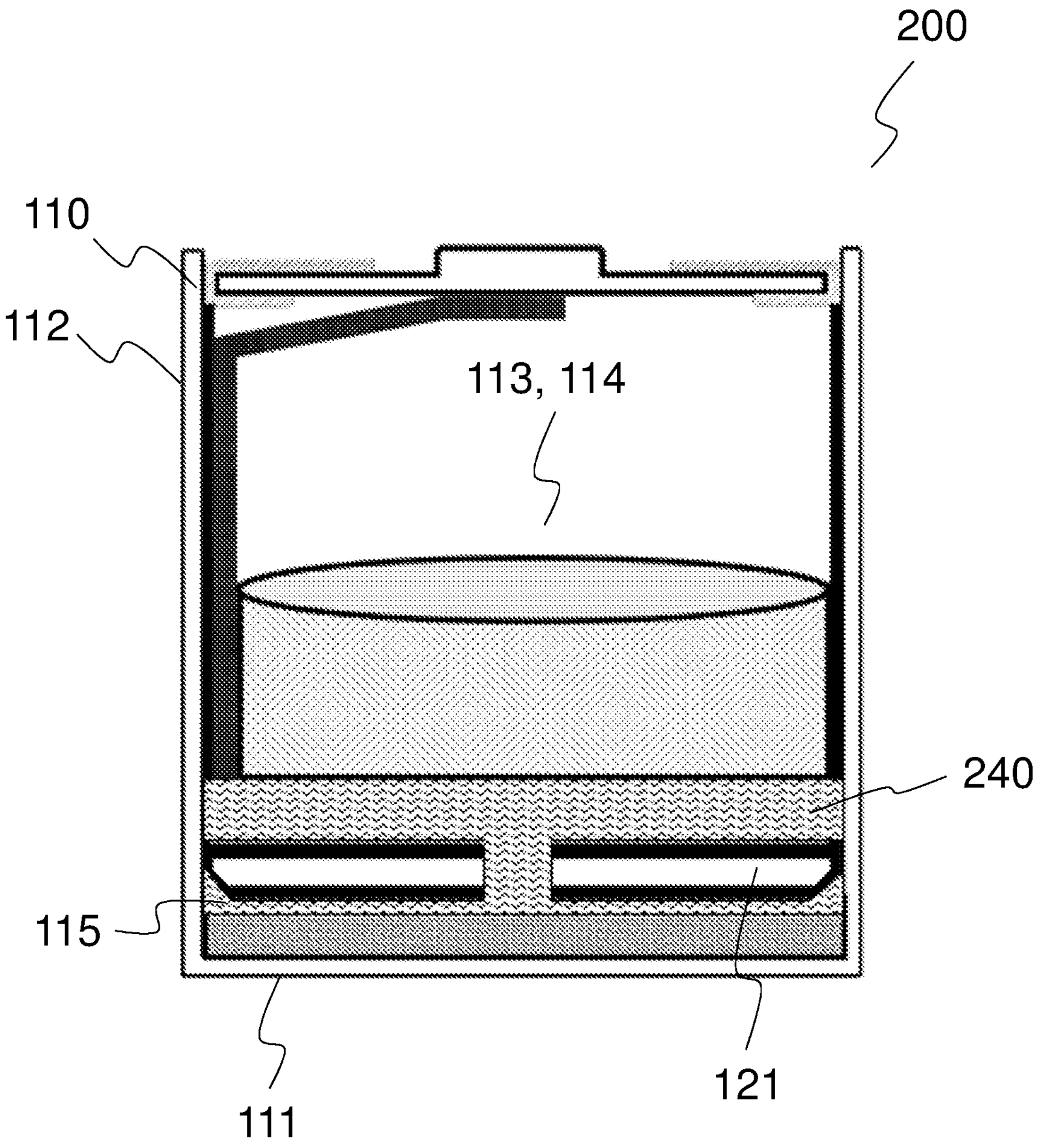
Figure 2C:
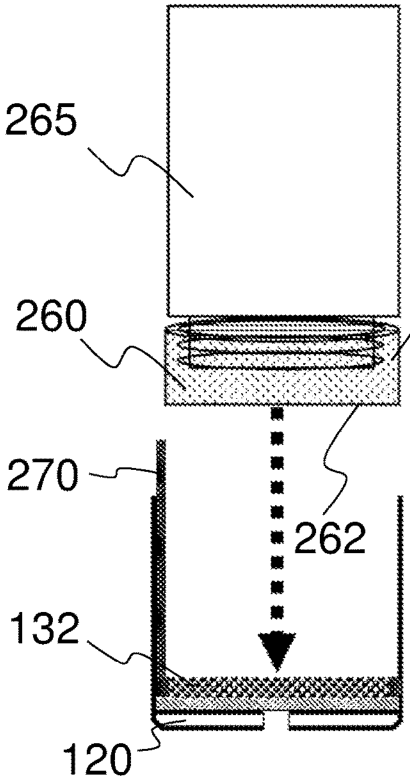
FIG. 2C to FIG. 2H show various schematic side views of a plug of the energy storage device of FIG. 2A and FIG. 2B, and an external tool for moving the plug with respect to the electrolyte-impermeable-barrier-member of the energy storage device of FIG. 2A and FIG. 2B, according to various embodiments.
Figure 2D:
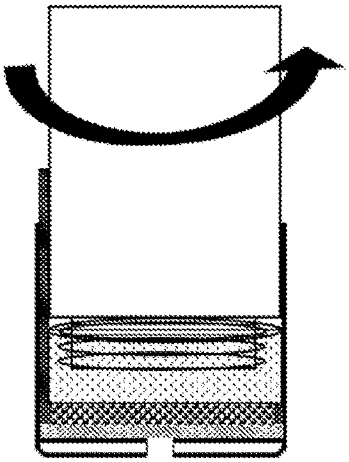
Figure 2E:
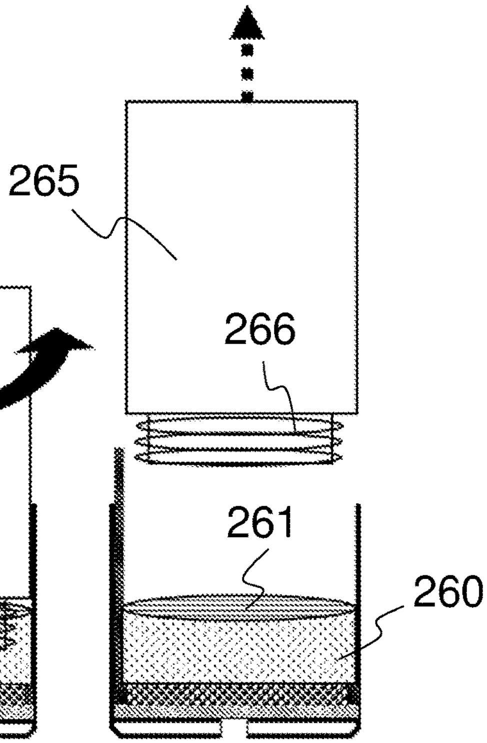

FIG. 2A and FIG. 2B show a schematic side view of an energy storage device 200, according to various embodiments.

According to various embodiments, there may be provided the energy storage device 200. According to various embodiments, the energy storage device 200 may contain any one or more or all the features and/or limitations of the energy storage device 100 of FIG. 1A and FIG. 1B. In the following, the energy storage device 200 is described with like reference characters generally referring to the same or corresponding parts/features of the energy storage device 100 of FIG. 1A and FIG. 1B. The description of the parts/features made with respect to the energy storage device 200 may also be applicable with respect to the energy storage device 100, and vice versa.

With reference to FIG. 2A, the energy storage device 200 may, similar to the energy storage device 100 of FIG. 1A and FIG. 1B, include the housing 110, the electrolyte-impermeable-barrier-member 120, the first electrode 131, and the second electrode 132.

With reference to FIG. 2B, energy storage device 200 may include (e.g. further include) the electrolyte 240. As shown, the electrolyte 240 may be disposed within the energy storage device 200 and with respect to the electrolyte-impermeable-barrier-member 120 in a manner so as to be shielded by the electrolyte-impermeable-barrier-member 120 (e.g. disposed within the internal space 113 of the housing 110) so as to prevent or minimize or reduce an extent of direct or immediate contact between the electrolyte 240 and the housing 110, while the electrolyte 240 interacts with the second electrode 132 within the receptacle space 114 and reaches or is able to reach or extend through the at least one through-hole 124 of the electrolyte-impermeable-barrier-member 120 to interact with the first electrode 131 within the intervening space 115. As shown, with the electrolyte-impermeable-barrier-member 120 shielding the electrolyte 240 (e.g. at least a portion, or most or a bulk of the electrolyte 240) from the at least one side wall 122 of the receptacle structure 123 of the electrolyte-impermeable-barrier-member 120, at least some or most (e.g. more than half or three quarters) of an inner surface area of the at least one side wall 122 of the receptacle structure 123 of the electrolyte-impermeable-barrier-member 120 may not be in contact (e.g. direct contact, immediate contact, and/or physical contact) with the electrolyte 240 while the electrolyte 240 is within the energy storage device 200 (e.g. within the housing 110 and/or within the receptacle structure 123 of the energy storage device 200).

Further, the energy storage device 200 may, similar to the energy storage device 100 of FIG. 1A and FIG. 1B, include the electrolyte-permeable-member 150 (e.g. separator).

With reference to FIG. 2A, the energy storage device 200 may include (e.g. further include) a cap member 271 configured to or which may be covered over an opening of the housing 110 (e.g. opposite the base portion 111 of the housing 110) to or for closing or sealing the housing 110 or the energy storage device 200. The cap member 271 may include or be made of a metal or an alloy material. Accordingly, the cap member 271 may, similar to the housing 110 (e.g. metallic housing 110), include or possess a property (e.g. physical property) of being electrically conductive. The cap member 271 may provide an electrical conduction pathway to an external electronic circuit or device or load. Thus, the cap member 271 may be configured as or may be a positive cap or positive terminal of the energy storage device 200 (e.g. a battery, a cell, etc.).

The housing 110, on the other hand, may be configured as or may be a negative housing 110 or negative terminal of the energy storage device 200 (e.g. battery, cell, etc.).

With reference to FIG. 2A, the energy storage device 200 may include (e.g. further include) an electrically insulating layer 272 configured to or for preventing contact (e.g. direct contact, and/or physical contact) of the cap member 271 with the housing 110. Thus, the cap member 271 may be covered over the opening of the housing 110, with the electrically insulating layer 272 therebetween or separating the cap member 271 and the housing 110. As an example, the electrically insulating layer 272 may be disposed (e.g. affixed or secured) to a rim or a border (e.g. entire rim or border) and/or to a base surface of the cap member 271 for preventing the cap member 271 from contacting (e.g. physically contacting) the housing 110 when the cap member 271 is covered over the opening of the housing 110.

With reference to FIG. 2A, the energy storage device 200 may include (e.g. further include) a current collector 270. As shown, the current collector 270 may be disposed or may be disposable within the receptacle structure 123 of the electrolyte-impermeable-barrier-member 120 of the energy storage device 200. In particular, the current collector 270 may be disposed and/or arranged (e.g. within the receptacle structure 123 of the electrolyte-impermeable-barrier-member 120) in a manner so as to contact (e.g. directly contact or indirectly contact, for enabling electrical contact or connection) both (i) the cap member 271 (e.g. by welding or pre-welding the current collector 270 and the cap member 271) and (ii) the second electrode 132. According to various embodiments, the current collector 270 may include or may be (e.g. may be composed of) an electrically conductive foil or mesh, for example, a Titanium foil or mesh, which may be stable in an aqueous environment, such as the electrolyte 240 (i.e. when the electrolyte 240 is an aqueous electrolyte 240). Accordingly, the current collector 270 may interact with the electrolyte 240 (e.g. may be soaked in an aqueous electrolyte 240) while providing an electrical pathway from the second electrode 132 (e.g. cathode) to the cap member 271 (e.g. positive battery/cell cap).

According to various embodiments, the second electrode 132 (e.g. cathode) may be pressed (e.g. pre-pressed) onto the current collector 270 (e.g. a Titanium foil or mesh), for example, to integrate and/or secure the current collector 270 within and/or to the second electrode 132.

As shown in FIG. 2A and FIG. 2B, the energy storage device 200 may, similar to the energy storage device 100 of FIG. 1A and FIG. 1B, include (e.g. further include) a plug 260. The plug 260 may differ from the plug 160 of FIG. 1C in that the plug 260 may be configured and/or sized or shaped to enable the current collector 270 to pass therethrough. According to various embodiments, the plug 260 may form a seal (e.g. an air-tight or fluid-tight seal) with the at least one side wall 122 of the receptacle structure 123 of the electrolyte-impermeable-barrier-member 120 and with the current collector 270 (e.g. external surface of the current collector 270) extending therethrough, so as to or for preventing at least the electrolyte 240, which may be an aqueous electrolyte, from escaping or leaking from the opening of the receptacle structure 123 of the electrolyte-impermeable-barrier-member 120 of the energy storage device 200.

FIG. 2C to FIG. 2H show various schematic side views of the plug 260 and an external tool 265 for moving the plug 260 with respect to the electrolyte-impermeable-barrier-member 120 of the energy storage device 200, according to various embodiments.

According to various embodiments, there may be provided the external tool 265, which may be similar or identical to the external tool 165 of FIG. 1C to FIG. 1E. Accordingly, the external tool 265 may be configured to be removably coupled or releasably attached to the plug 260 for moving the plug 260 via the external tool 265. As shown, the external tool 265 may be an elongated structure.

The plug 260 may include an auxiliary engagement element 261. As shown, the auxiliary engagement element 261 of the plug 260 may be directed outwards and away from the electrolyte-impermeable-barrier-member 120 (e.g. when the plug 260 disposed within or is closing the receptacle structure 123 of the electrolyte-impermeable-barrier-member 120). The auxiliary engagement element 261 may be configured to removably couple or releasably attach with or to the external tool 265 in a manner so as to enable movement or displacement of the plug 260 via the external tool 265. For example, the auxiliary engagement element 261 may be configured to removably couple with or releasably attach to a first end of the external tool 265, e.g. via a corresponding auxiliary engagement element 266 of the external tool 265 at the first end of the external tool 265. Further, a second opposite end of the external tool 265 may serve or function as a handle of the external tool 265 for moving the external tool 265 together with the plug 260 attached thereto.

As shown, according to various embodiments, the plug 260 may include a base portion 262 (e.g. closed end, and/or substantially flat end) and at least one side wall 263 extending from the base portion 262 to form a receptacle structure of the plug 260.

The base portion 262 of the plug 260 may be oriented to face or may be directed towards the electrolyte-impermeable-barrier-member 120 (e.g. the base portion 121 of the electrolyte-impermeable-barrier-member 120) when the plug 260 is removably attached to the opening of the receptacle structure 123 of the electrolyte-impermeable-barrier-member 120 to close the receptacle structure 123 of the electrolyte-impermeable-barrier-member 120.

According to various embodiments, the auxiliary engagement element 261 of the plug 260 may include or may be internal screw thread(s) along the at least one side wall 263 (e.g. inward facing surface(s) of the at least one side wall 263) of the plug 260. In particular, the internal screw thread(s) may be directed outwards and away from the electrolyte-impermeable-barrier-member 120 when the plug 260 is removably attached to the opening of the receptacle structure 123 of the electrolyte-impermeable-barrier-member 120 to close the receptacle structure 123 of the electrolyte-impermeable-barrier-member 120.

The corresponding auxiliary engagement element 266 of the external tool 265 may be corresponding external screw thread(s) along an external surface of the external tool 265 configured to or for forming a threaded engagement or joint with the auxiliary engagement element 261 (e.g. the internal screw thread(s)) of the plug 260.

Accordingly, to close the opening of the receptacle structure 123 of the electrolyte-impermeable-barrier-member 120 with the plug 260, using the external tool 265, initially (e.g. when the plug 260 and the external tool 265 are outside of the receptacle structure 123 of the electrolyte-impermeable-barrier-member 120), the corresponding auxiliary engagement element 266 of the external tool 265 (e.g. external screw thread(s)) may be threaded to the auxiliary engagement element 261 of the plug 260 (e.g. internal screw thread(s)), for instance, by rotating the external tool 265 relative to the plug 260 (e.g. stationary plug 260) in a first angular direction (e.g. clockwise direction when looking along and into a longitudinal axis of the external tool 265 from the second end of the external tool 265 that is opposite the corresponding auxiliary engagement element 266 at the first end of the external tool 265) to form the threaded engagement or joint between the external tool 265 and the plug 260. The external tool 265 with the plug 260 attached thereto may thereafter be oriented in a manner such that the base portion 262 of the plug 260 is directed towards the electrolyte-impermeable-barrier-member 120 (e.g. directed towards the base portion 121 of the receptacle structure 123 of the electrolyte-impermeable-barrier-member 120). The external tool 265 with the plug 260 attached thereto may then be inserted (e.g. slotted) into the receptacle structure 123 of the electrolyte-impermeable-barrier-member 120 (e.g. towards the base portion 121 of the electrolyte-impermeable-barrier-member 120) so as to position the plug 260 over internal component(s) (e.g. at least the second electrode 132) of the energy storage device 200 and/or to removably attach the plug 260 to the opening of the receptacle structure 123 of the electrolyte-impermeable-barrier-member 120 to close the electrolyte-impermeable-barrier-member 120.

When the electrolyte-impermeable-barrier-member 120 is closed with the plug 260, the external tool 265 may be rotated relative to the plug 260 (e.g. with the plug 260 held stationary) in a second angular direction (e.g. anti-clockwise direction) opposite to the first angular direction to release or separate the external tool 265 from the plug 260. Thereafter, the external tool 265 may be removed from the receptacle structure 123 of the electrolyte-impermeable-barrier-member 120, while leaving the plug 260 within the receptacle structure 123, for example, to allow the cap member 271 to be covered over the opening of the housing 110.

To remove the plug 260 from within the receptacle structure 123 of the electrolyte-impermeable-barrier-member 120, the cap member 271 (if present) may first be removed from the housing 110. The external tool 265 may then be inserted (e.g. slotted) into the receptacle structure 123 of the electrolyte-impermeable-barrier-member 120, with the corresponding auxiliary engagement element 266 (e.g. external screw thread(s)) of the external tool 265 directed and moved towards the auxiliary engagement element 261 (e.g. internal thread(s)) of the plug 260 to thread the corresponding auxiliary engagement element 266 of the external tool 265 to the auxiliary engagement element 261 of the plug 260 to form the threaded engagement or joint between the external tool 265 and the plug 260. With the threaded engagement or joint formed, the plug 260 may then be lifted or pulled out and away from the receptacle structure 123 of the electrolyte-impermeable-barrier-member 120, via the external tool 265 (e.g. by moving the external tool 265 with the plug 260 attached thereto out and away from the receptacle structure 123 of the electrolyte-impermeable-barrier-member 120).

Figures 2F, 2G, 2H:
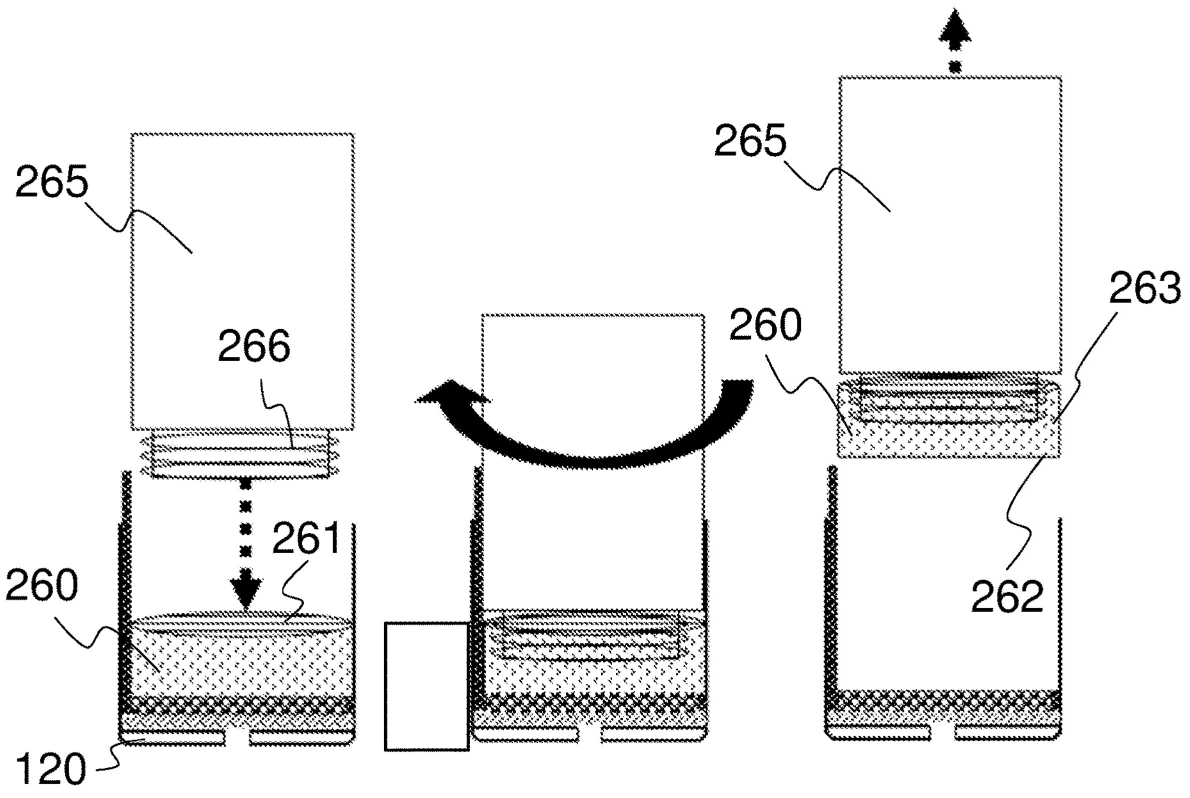
Figure 2I:
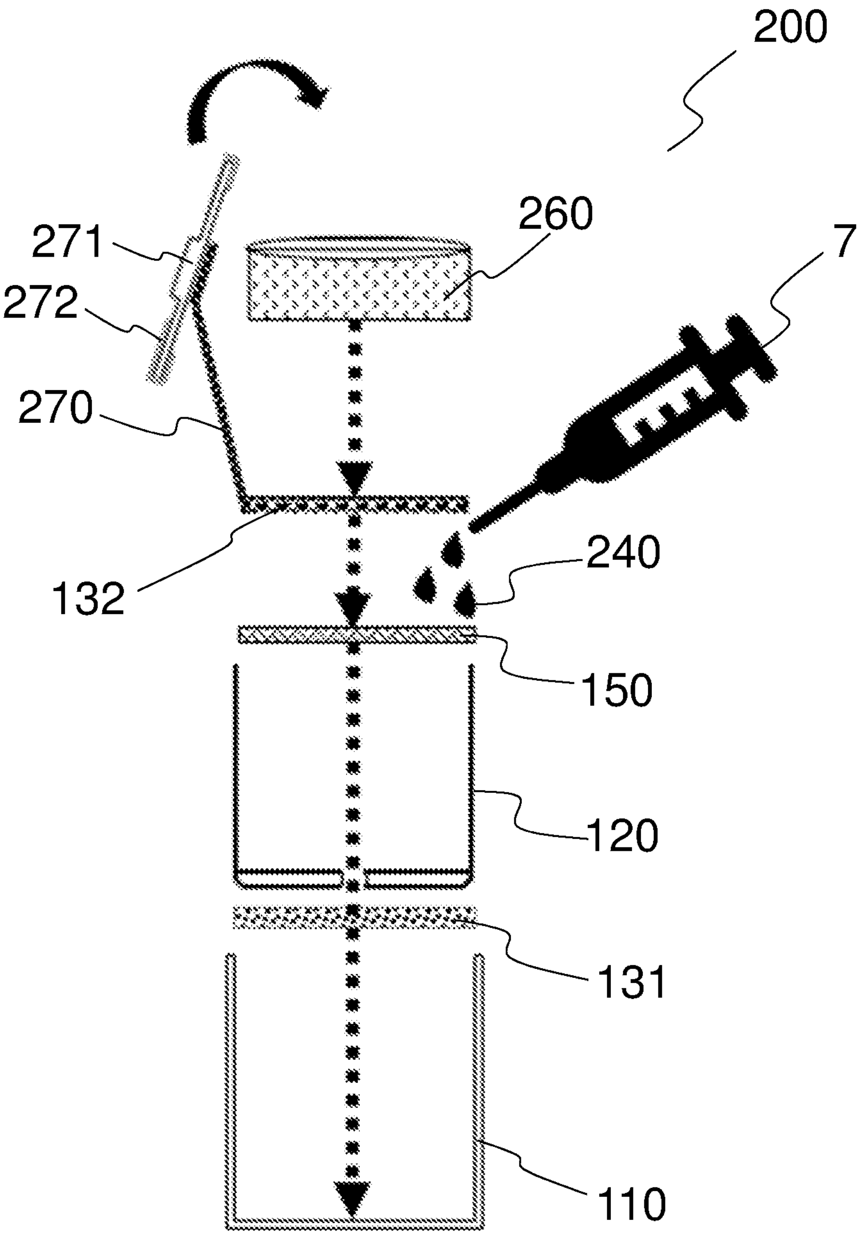
FIG. 2I shows an exploded view of the energy storage device of FIG. 2A and FIG. 2B, according to various embodiments.

FIG. 2I shows an exploded view of the energy storage device 200 of FIG. 2A and FIG. 2B, according to various embodiments.

Figure 3:
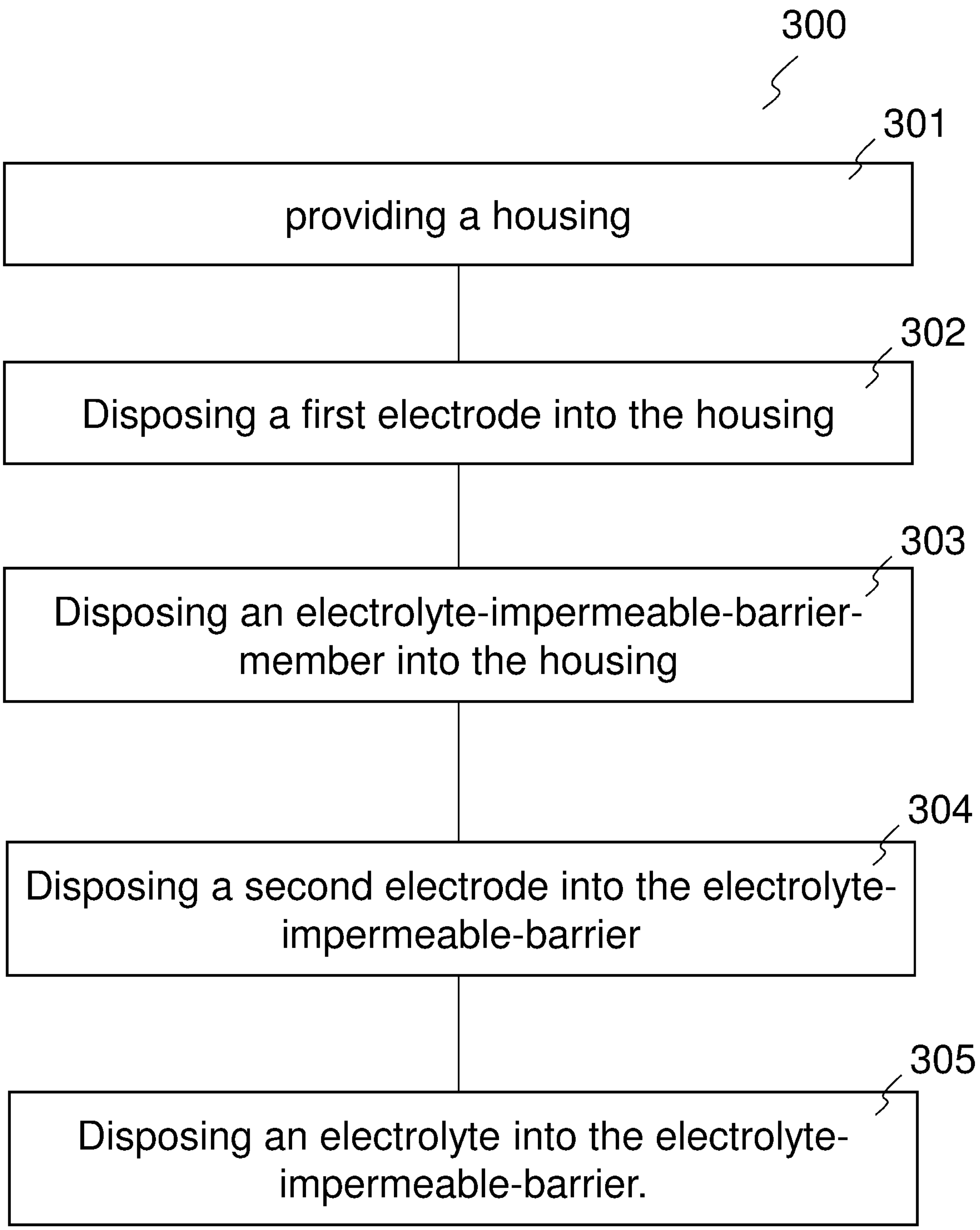
FIG. 3 depict a method of assembling the energy storage device of FIG. 1A and FIG. 1B or the energy storage device of FIG. 2A and FIG. 2B, according to various embodiments.

FIG. 3 depict a method 300 of assembling the energy storage device 100 of FIG. 1A and FIG. 1B or the energy storage device 200 of FIG. 2A and FIG. 2B, according to various embodiments.

With reference to FIG. 1A, FIG. 2F and FIG. 3, a method 300 of assembling the energy storage device 100 of FIG. 1A and FIG. 1B or the energy storage device 200 of FIG. 2A and FIG. 2B, according to various embodiments, may be described.

According to various embodiments, the method 300 of assembling the energy storage device 100 or 200 may include (at 301 in FIG. 3) providing the housing 100. The housing may define the internal space 113.

According to various embodiments, the method 300 may further include (at 302 in FIG. 3) disposing the first electrode 131 into the housing 100, more specifically, in the internal space 113 of the housing 100.

According to various embodiments, the method 300 may further include (at 303 in FIG. 3) disposing the electrolyte-impermeable-barrier-member 120 into the housing 100. More specifically, the electrolyte-impermeable-barrier-member 120, which may include the base portion 121 and the at least one side wall 122 extending from the base portion 121 of the electrolyte-impermeable-barrier-member 120 forming the receptacle structure 123, may be disposed into the internal space 113 of the housing 100 in the manner so as to partition the internal space 113 of the housing 100 into the receptacle space 114 bound by the electrolyte-impermeable-barrier-member 120 and the intervening space 115 between the housing 100 and the electrolyte-impermeable-barrier-member 120.

According to various embodiments, the method 300 may include disposing the first electrode 131 in the intervening space 115 between the housing 100 and the electrolyte-impermeable-barrier-member 120.

According to various embodiments, the method 300 may further include (at 304 in FIG. 3) disposing the second electrode 132 into the electrolyte-impermeable-barrier, more specifically, in the receptacle space 114 within the electrolyte-impermeable-barrier-member 120.

According to various embodiments, the method 300 may further include (at 305 in FIG. 3) disposing the electrolyte 240 (e.g. using syringe 7 to inject the electrolyte 240) into or with respect to the electrolyte-impermeable-barrier-member 120 in a manner so as to shield the electrolyte 240 from contact (e.g. direct and/or physical contact) with the housing 100. The electrolyte 240 may interact with the second electrode 132 within the receptacle structure 123 of the electrolyte-impermeable-barrier-member 120 and may reach through the at least one through-hole 124 of the receptacle structure 123 of the electrolyte-impermeable-barrier-member 120 to interact with the first electrode 131 within the intervening space 115 between the housing 100 and the electrolyte-impermeable-barrier-member 120. The at least one through-hole 124 of the receptacle structure 123 of the electrolyte-impermeable-barrier-member 120 may serve as the channel connecting the receptacle structure 123 of the electrolyte-impermeable-barrier-member 120 and the intervening space 115 between the housing 100 and the electrolyte-impermeable-barrier-member 120.

According to various embodiments, in the method 300 of assembling the energy storage device 100 or 200 as described, disposing the second electrode 132 in the receptacle space 114 within the electrolyte-impermeable-barrier-member 120 may be after or subsequent to disposing the electrolyte 240 with respect to the electrolyte-impermeable-barrier-member 120. According to various other embodiments, in the method 300 of assembling the energy storage device 100 or 200 as described, disposing the second electrode 132 in the receptacle space 114 within the electrolyte-impermeable-barrier-member 120 may be before or prior to disposing the electrolyte 240 with respect to the electrolyte-impermeable-barrier-member 120.

According to various embodiments, in the method 300 of assembling the energy storage device 100 or 200 as described, disposing the first electrode 131 into the internal space 113 of the housing 100 may include placing the first electrode 131 on (e.g. directly on) and/or over the base portion 111 of the housing 100. The housing 100 may accordingly include the base portion 111 and may further include the at least one side wall 112 extending from the base portion 111 of the housing 100.

According to various embodiments, the method 300 may further include disposing the electrolyte-permeable-member 150 within the receptacle structure 123 of the electrolyte-impermeable-barrier-member 120 to cover over the at least one through-hole 124 of the electrolyte-impermeable-barrier-member 120 from within the electrolyte-impermeable-barrier-member 120.

According to various embodiments, in the method 300 of assembling the energy storage device 100 or 200 as described, disposing the electrolyte-impermeable-barrier-member 120 into the internal space 113 of the housing 100 may include stacking the base portion 121 of the electrolyte-impermeable-barrier-member 120 on (e.g. directly or indirectly on) and/or over the first electrode 131. The at least one through-hole 124 of the receptacle structure 123 of the electrolyte-impermeable-barrier-member 120 may be at the base portion 121 of the electrolyte-impermeable-barrier-member 120.

According to various embodiments, in the method 300 of assembling the energy storage device 100 or 200 as described, disposing the second electrode 132 in the receptacle space 114 within the electrolyte-impermeable-barrier-member 120 may include placing the second electrode 132 above the base portion 121 of the electrolyte-impermeable-barrier-member 120. Further, disposing the electrolyte 240 with respect to the electrolyte-impermeable-barrier-member 120 may include disposing the electrolyte 240 (e.g. via the syringe 7) into the receptacle space 114 within the electrolyte-impermeable-barrier-member 120.

According to various embodiments, the method 300 may further include attaching the plug 160 or 260 to the opening of the electrolyte-impermeable-barrier-member 120 (e.g. opposite the base portion 121 of the electrolyte-impermeable-barrier-member 120) to close the electrolyte-impermeable-barrier-member 120 for encasing the second electrode 132 (e.g. at least the second electrode 132) within the receptacle structure 123 of the electrolyte-impermeable-barrier-member 120. The plug 160 or 260 may include the engagement element configured to engage the corresponding engagement element at the at least one side wall 122 of the electrolyte-impermeable-barrier-member 120 for removable attachment of the plug 160 or 260 to the electrolyte-impermeable-barrier-member 120.

According to various embodiments, in the method 300 of assembling the energy storage device 100 or 200 as described, attaching the plug 160 or 260 to the opening of the electrolyte-impermeable-barrier-member 120 may include (i) moving the plug 160 or 260 via the external tool 165 or 265 removably coupled to the auxiliary engagement element 161 or 261 of the plug 160 or 260 to engage the engagement element of the plug 160 or 260 with the corresponding engagement element of the electrolyte-impermeable-barrier-member 120 for attaching the plug 160 or 260 to the opening of the electrolyte-impermeable-barrier-member 120, wherein the auxiliary engagement element 161 or 261 of the plug 160 or 260 may be directed outwards and away from the electrolyte-impermeable-barrier-member 120, and may further include (ii) decoupling the external tool 165 or 265 from the auxiliary engagement element 161 or 261 of the plug 160 or 260 after the plug 160 or 260 is attached to the opening of the electrolyte-impermeable-barrier-member 120.

According to various embodiments, the method 300 may further include providing the cap member 271. Further, the method 300 may include covering the cap member 271 over the opening of the housing 110 (e.g. opposite the base portion 111 of the housing 110) to or for closing or sealing the housing 110 of the energy storage device 100 or 200.

According to various embodiments, the method 300 may further include providing the electrically insulating layer 272 between the cap member 271 and the housing 110 to or for preventing contact (e.g. direct contact, and/or physical contact) of the cap member 271 with the housing 110.

According to various embodiments, the method 300 may further include providing the current collector 270. The current collector 270 may be disposed within the receptacle structure 123 of the electrolyte-impermeable-barrier-member 120 of the energy storage device 100 or 200. In particular, the current collector 270 may be disposed and/or arranged in a manner so as to contact both the cap member 271 and the second electrode 132.

Figure 4:
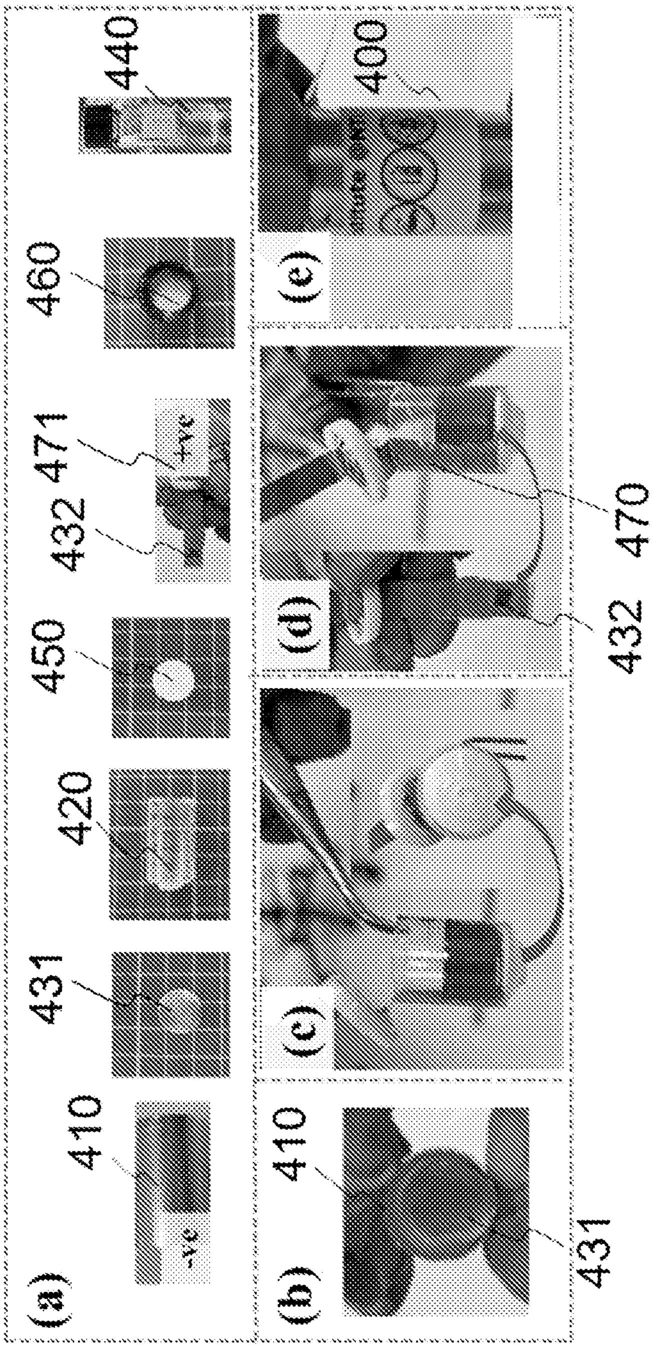
FIG. 4(*a*) to FIG. 4(*e*) are photographs of a prototype energy storage device, according to various embodiments.

FIG. 4(*a*) to FIG. 4(*e*) are photographs of a prototype energy storage device 400, according to various embodiments.

According to various embodiments, the energy storage device 400 may be a prototype of the energy storage device 200 of FIG. 2A and FIG. 2B. The energy storage device 400 may be referred to or may be configured as a cell configuration for an aqueous energy storage system 400.

FIG. 4(*a*) show a group of various cell components of the aqueous energy storage system 400.

As shown, the aqueous energy storage system 400 may include an external housing 410, which may be similar or identical to the housing 110 of the energy storage device 100 of FIG. 1A and FIG. 1B or the energy storage device 200 of FIG. 2A and FIG. 2B.

The aqueous energy storage system 400 may further include an internal housing 420, which may be similar or identical to the electrolyte-impermeable-barrier-member 120 of the energy storage device 100 or 200. Accordingly, the internal housing 420 may be disposable within the external housing 410 (e.g. in a manner so as to partition an internal space of the external housing 410 into a receptacle space bound by the internal housing 420 and an intervening space between the external housing 410 and the internal housing 420). Further, the internal housing 420 may define or may include at least one through-hole or an opening (e.g. which may be similar or identical to the at least one though-hole 124 of the electrolyte-impermeable-barrier-member 120 of the energy storage device 100 or 200) for an electrolyte 240 or 440 to reach therethrough.

The aqueous energy storage system 400 may further include a separator 450, which may be similar or identical to the electrolyte-permeable-member 150 of the energy storage device 100 or 200.

The aqueous energy storage system 400 may further include an anode 431, which may be similar or identical to the first electrode 131 of the energy storage device 100 or 200. According to various embodiments, the anode 431 may be a Zn anode 431. According to various embodiments, the anode 431 may include or may be configured as a Zn metal foil.

The aqueous energy storage system 400 may further include a cathode 432, which may be similar or identical to the second electrode 132 of the energy storage device 100 or 200. According to various embodiments, the cathode 432 may include or may be configured with a positive casing. For example, the cathode 432 may be a cathode 432 material with conductive carbon and binder, and may be connected (e.g. so as to form an electrically conductive path with) or may be combined or integrated with (e.g. meshed with) the current collector. The current collector 470 may be similar or identical to the current collector 270 of the energy storage device 200. More specifically, the cathode 432 may include Prussian blue analogues (PBA) with conductive carbon. The binder may be pre-pressed onto a titanium mesh (e.g. the current collector 470) and may be placed facing or directed towards the separator 450. The current collector 470 may, in turn, be connected (e.g. so as to form an electrically conductive path) with a battery cap 471 (e.g. which may be a positive terminal) of the energy storage device 400. The battery cap 471 may be similar or identical to the cap member 271 of the energy storage device 100 or 200. The battery cap 471 may include an electrically insulating layer, which may be similar or identical to the electrically insulating layer 272 of the energy storage device 100 or 200.

The aqueous energy storage system 400 may further include the electrolyte 440, which may be similar or identical to the electrolyte 240.

With reference to FIG. 4(*b*) to FIG. 4(*d*), the anode 431 may be placed or disposed within the external housing 410, for example, on a base portion of the external housing 410. In particular, when the internal housing 420 is disposed within the internal space of the external housing 410, the anode 431 may be placed or disposed within the intervening space between the external housing 410 and the internal housing 420.

The separator 450, the cathode 432, and the electrolyte 440 (which may collectively be referred to as "internal components" of the energy storage device 400) may be placed within the internal housing 420.

The internal housing 420 may be disposed in (in other words, may be received within) the external housing 410. The at least one through-hole or the opening of the internal housing 420 may be at a bottom or base of the internal housing 420. Accordingly, when the internal housing 420 is disposed in the external housing 410 (e.g. with the base of the internal housing 420 directed towards the external housing 410 or the base of the external housing 410), the at least one through-hole or the opening of the internal housing 420 may channel the electrolyte 440 (e.g. at least some of the electrolyte 400) from within the internal housing 420 to the anode 431 that is within the external housing 410 (e.g. that is on the base of the external housing 410). In other words, the electrolyte 440 may be disposed with respect to the internal housing 420 (e.g. which may, in turn, be disposed within the external housing 410) in a manner so as to be shielded by the internal housing 420 from direct contact with the external housing 410 (e.g. at least some, or most, or entire housing), wherein the electrolyte 440 may interact with the cathode 432 within the receptacle space of the internal housing 420 and may reach through the at least one through-hole or the opening of the internal housing 420 to interact with the anode 431 within the intervening space between the external housing 410 and the internal housing 420.

In addition, the internal housing 420 may be detachable from the external housing 410. Accordingly, the internal housing 420 may be detached, as a single unit together with the internal components (e.g. at least the separator 450 and the cathode 432) contained in the internal housing 420, from the external housing 410, for example, during disassembly of the energy storage device 400, for example, for parts inspection or replacement and/or maintenance.

FIG. 4(*e*) shows an assembled aqueous energy storage system 400 (e.g. a fully assembled PBA/Zn cell).

Figure 4F:
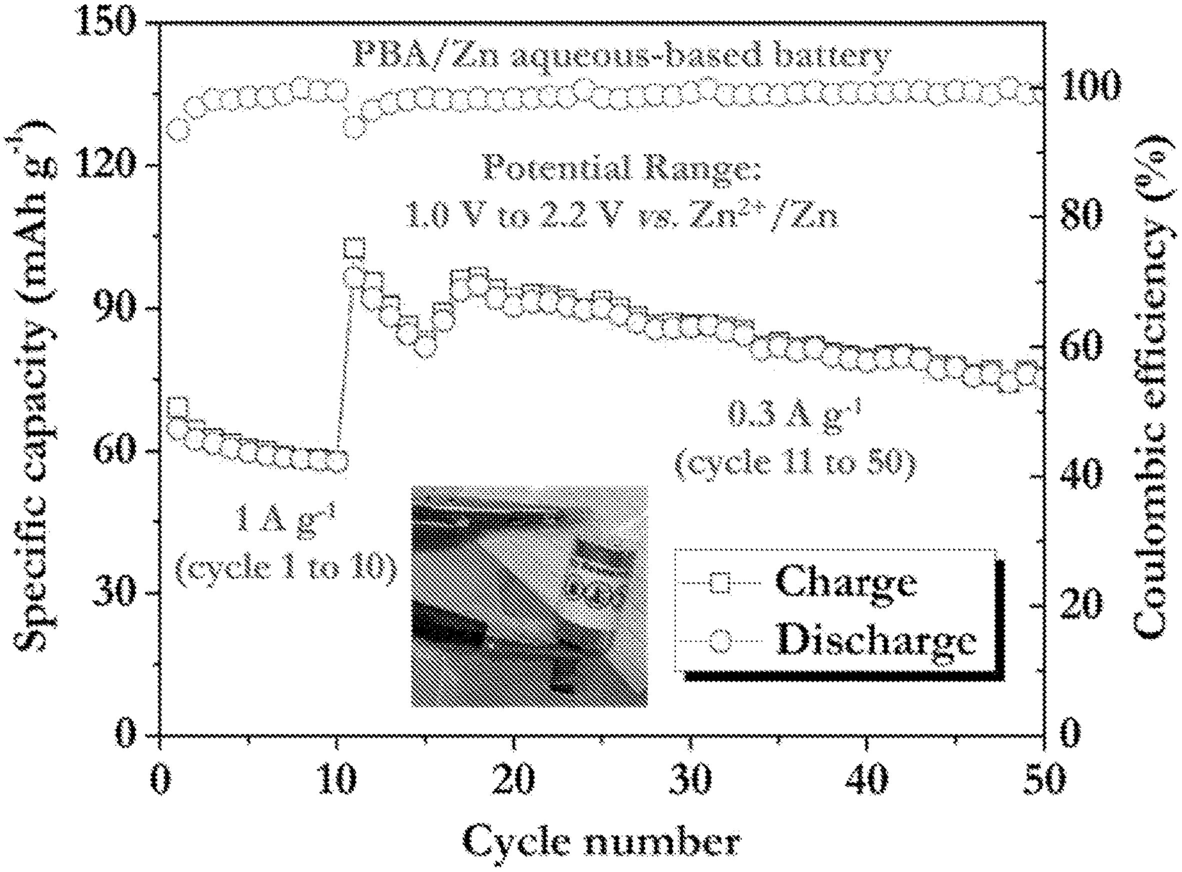
FIG. 4F shows a graph depicting electrochemical cycle stability of Prussian blue analogues (PBA)/Zn aqueous rechargeable cell tested with the configuration of the prototype energy storage device of FIG. 4(*a*) to FIG. 4(*e*)
Figure 4G:
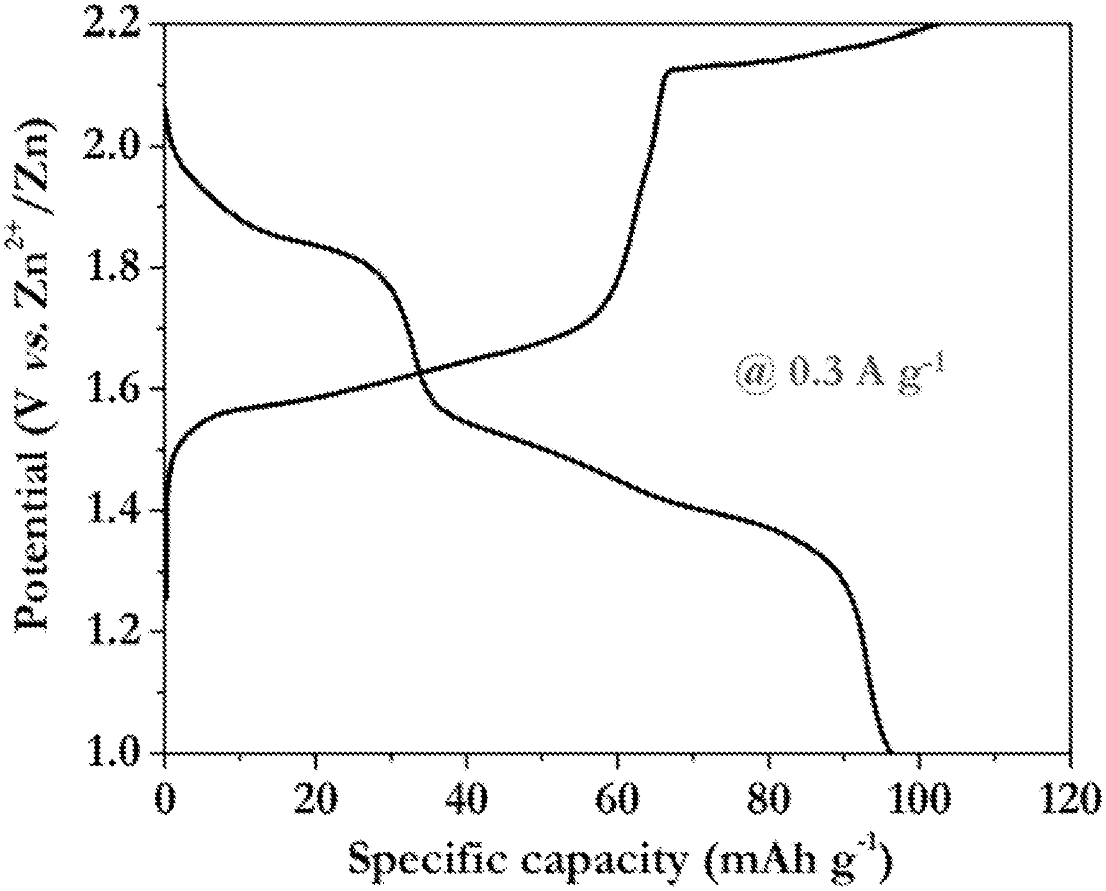
FIG. 4G shows a graph depicting typical galvanostatic charge and discharge curves of PBA/Zn aqueous rechargeable cell tested with the configuration of the prototype energy storage device of FIG. 4(*a*) to FIG. 4(*e*)

FIG. 4F shows a graph depicting electrochemical cycle stability of PBA/Zn aqueous rechargeable cell tested with the configuration of the energy storage system 400; and FIG. 4G shows a graph depicting typical galvanostatic charge and discharge curves of PBA/Zn aqueous rechargeable cell tested with the configuration of the energy storage system 400.

With reference to FIG. 4(*e*), metallic (e.g. titanium) foils may be welded to an end of the external housing 410 and to the battery cap 471 (e.g. positive cap) of the energy storage device 400 for battery testing purposes. For example, the assembled aqueous-based rechargeable PBA/Zn full cell (i.e. the aqueous energy storage system 400) may be electrochemically tested at different current rates at 1 A $g^{-1}$ and 0.3 A $g^{-1}$ between 1.0 to 2.2 V vs. $Zn^{2+}/Zn$, within the test results shown in the graph of FIG. 4F. The galvanostatic charge and discharge curves of the full cell cycled at 0.3 A g-1 are illustrated in FIG. 4G.

Figure 5:
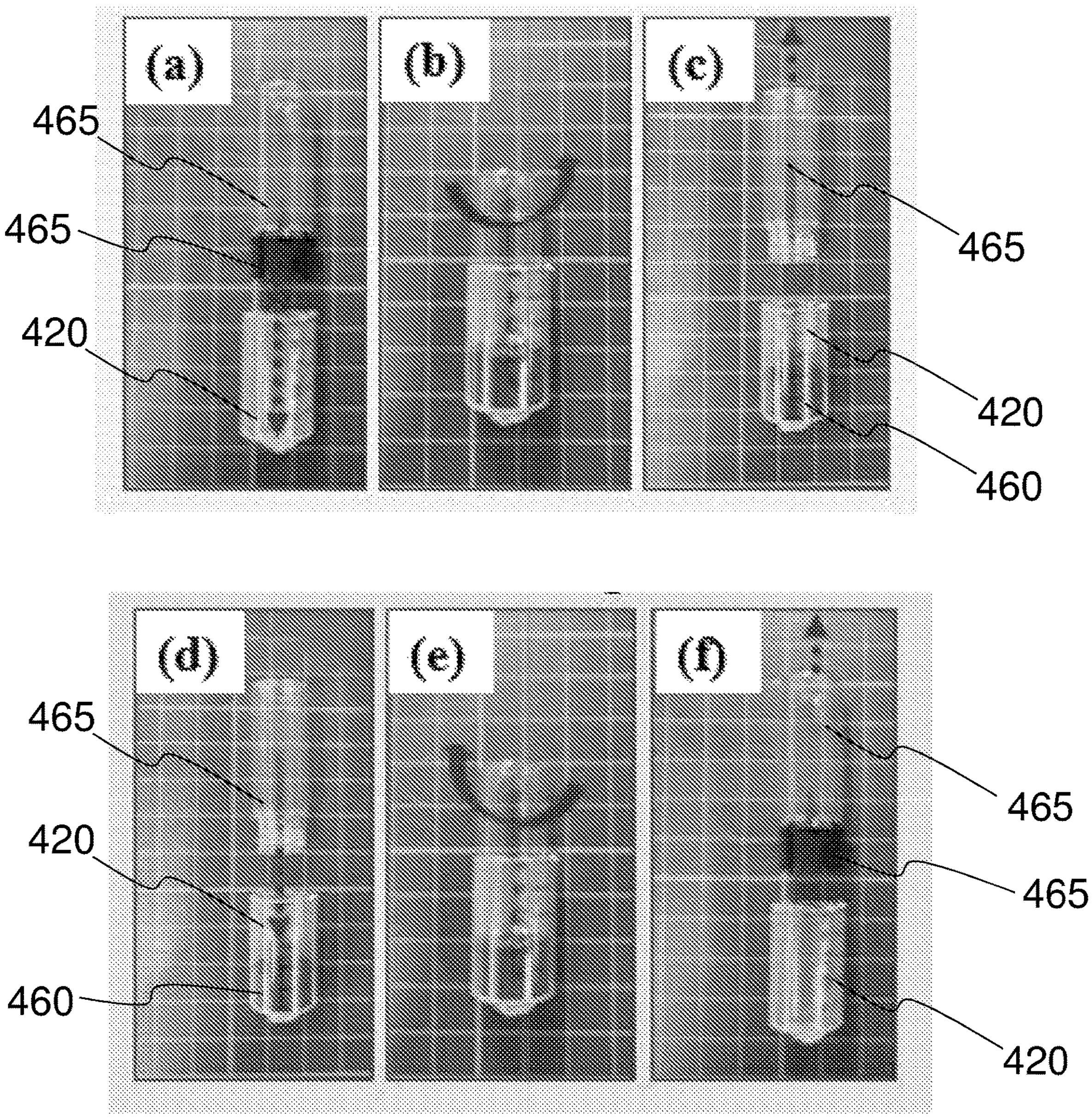
FIG. 5(*a*) to FIG. 5(*c*) show various views of a plug of the prototype energy storage device of FIG. 4(*a*) to FIG. 4(*e*) in a locking operation to close an opening of an internal housing of the energy storage device of FIG. 4(*a*) to FIG. 4(*e*), according to various embodiments processes.

FIG. 5(*a*) to FIG. 5(*c*) show various views of a plug 460 of the energy storage device 400 of FIG. 4(*a*) to FIG. 4(*e*) in a locking operation to close the opening of the internal housing 420 of the energy storage device 400, according to various embodiments processes.

FIG. 5(*d*) to FIG. 5(*f*) show various views of the plug 460 used in an unlocking operation to remove the plug 460 from the internal housing 420 of the energy storage device 400, according to various embodiments processes.

As shown, the plug 460 may resemble a cap with a flat (e.g. substantially flat) or a planar end on a first side (e.g. a first axial end surface, or bottom surface of the plug 460) and an inner screw-thread opposite the first side. The plug 460 may be configure to be releasably engageable with an external tool 465. The description of the parts/features made with respect to plug 460 may also be applicable with respect to the plug 160 and/or 260, and vice versa. The description of the parts/features made with respect to external tool 465 may also be applicable with respect to the external tool 165 and/or 265, and vice versa.

During the locking operation (e.g. to close the opening of the internal housing 420), the external tool 465 (e.g. an elongate structure, or a bottle, or a bottle-like tool) configured to be removably coupled or releasably attached to the plug 460 (e.g. via a threaded engagement or joint) for moving the plug 460 via the external tool 465, may be removably coupled or releasably attached to the plug 460 (e.g. by turning the external tool 465 with respect to the plug 460 in a clockwise manner). The external tool 465 with the plug 460 attached thereto may then be inserted or slotted into the internal housing 420. Thereafter, the external tool 465 may be separated from the plug 460 and removed from the internal housing 420 (e.g. by turning the external tool 465 with respect to the plug 460 in an anti-clockwise manner), leaving only the plug 460 within the internal housing 420.

During the unlocking operation to remove the plug 460 from the internal housing 420, the external tool 465 may be re-attached to the plug 460 (e.g. by moving the external tool 465 towards the plug 460 and turning the external tool 465 in the clockwise manner) and extracting the plug 460 out of the internal housing 420 by moving the external tool 465 with the plug 460 attached thereto away from the internal housing 420.

Various embodiments may thus provide an energy storage device which is capable of minimizing or reducing an extent of electrolytic corrosion on the housing of the energy storage device in comparison to conventional energy storage devices.

Various embodiments may also provide an energy storage device which is easy to disassembly and assemble, using an internal housing and an external housing.

Various embodiments may also provide an energy storage device having pellet-shaped electrodes which are capable of withstanding high axial loads acting thereon.

Various embodiments may also provide a plug (e.g. which may be part of a unique locking/unlocking mechanism) for the energy storage device, or may provide an energy storage device having the said plug, which is configured to be easily installed or removed (e.g. from an internal housing) of the energy storage device.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An energy storage device comprising:

a housing defining an internal space;

an electrolyte-impermeable-barrier-member disposed within the internal space of the housing, the electrolyte-impermeable-barrier-member comprising a base portion and at least one side wall extending from the base portion of the electrolyte-impermeable-barrier-member to form a receptacle structure, wherein the electrolyte-impermeable-barrier-member partitions the internal space of the housing into a receptacle space bound by the electrolyte-impermeable-barrier-member and an intervening space between the housing and the electrolyte-impermeable-barrier-member, wherein the receptacle structure forming the electrolyte-impermeable-barrier-member comprises at least one through-hole serving as a channel connecting the receptacle space and the intervening space;

a first electrode disposed in the intervening space between the housing and the electrolyte-impermeable-barrier-member;

a second electrode disposed in the receptacle space within the electrolyte-impermeable-barrier-member; and an electrolyte disposed with respect to the electrolyte-impermeable-barrier-member in a manner so as to be shielded by the electrolyte-impermeable-barrier-member from direct contact with the housing, wherein the electrolyte interacts with the second electrode within the receptacle space of the electrolyte-impermeable-barrier-member and reaches through the at least one through-hole of the electrolyte-impermeable-barrier-member to interact with the first electrode within the intervening space between the housing and the electrolyte-impermeable-barrier-member.

2. The energy storage device according to claim 1, wherein the electrolyte is an aqueous electrolyte.

3. The energy storage device according to claim 1, wherein the housing comprises a base portion and at least one side wall extending from the base portion of the housing, wherein the electrolyte-impermeable-barrier-member is oriented with the at least one side wall of the electrolyte-impermeable-barrier-member aligned to the at least one side wall of the housing, wherein the electrolyte is disposed with respect to the electrolyte-impermeable-barrier-member such that the at least one side wall of the electrolyte-impermeable-barrier-member shields the electrolyte from the at least one side wall of the housing.

4. The energy storage device according to claim 1, further comprising:

an electrolyte-permeable-member disposed within the receptacle space of the electrolyte-impermeable-barrier-member;

wherein the electrolyte-permeable-member covers over the at least one through-hole of the electrolyte-impermeable-barrier-member from within the electrolyte-impermeable-barrier-member.

5. The energy storage device according to claim 1, wherein the at least one through-hole of the electrolyte-impermeable-barrier-member is at the base portion of the electrolyte-impermeable-barrier-member, wherein the base portion of the electrolyte-impermeable-barrier-member is stacked directly on the first electrode, wherein the second electrode is disposed within the receptacle space of the electrolyte-impermeable-barrier-member and above the base portion of the electrolyte-impermeable-barrier-member.

6. The energy storage device according to claim 5, wherein the housing is of a cylindrical shape and the electrolyte-impermeable-barrier-member is of a cylindrical shape, wherein the electrolyte-impermeable-barrier-member and the housing are aligned in a coaxial manner, and wherein the first electrode is sandwiched between the base portion of the electrolyte-impermeable-barrier-member and the base portion of the housing.

7. The energy storage device according to claim 1, further comprising a plug removably attached to an opening of the electrolyte-impermeable-barrier-member opposite the base portion of the electrolyte-impermeable-barrier-member to close the electrolyte-impermeable-barrier-member for encasing the second electrode within the electrolyte-impermeable-barrier-member;

wherein the plug comprises an engagement element configured to engage a corresponding engagement element at the at least one side wall of the electrolyte-impermeable-barrier-member for removable attachment of the plug to the electrolyte-impermeable-barrier-member.

8. The energy storage device according to claim 7, wherein the plug is inserted into the opening of the electrolyte-impermeable-barrier-member to close the electrolyte-impermeable-barrier-member.

9. The energy storage device according to claim 8, further comprising:

a cap member covered over an opening of the housing opposite the base portion of the housing.

10. The energy storage device according to claim 7, wherein the engagement element of the plug and the corresponding engagement element of the electrolyte-impermeable-barrier-member are engaged to each other via a snap-fit engagement, a press-fit engagement, a friction-fit engagement, a magnetic engagement, or a ferromagnetic engagement element, or a threaded engagement.

11. The energy storage device according to claim 7, wherein the plug comprises an auxiliary engagement element directed outwards and away from the electrolyte-impermeable-barrier-member, wherein the auxiliary engagement element is configured to removably couple with an external tool in a manner so as to move the plug using the external tool for disengaging the engagement element of the plug from the corresponding engagement element of the electrolyte-impermeable-barrier-member so as to remove the plug from the electrolyte-impermeable-barrier-member.

12. The energy storage device according to claim 1, wherein the electrolyte-impermeable-barrier-member is made of a polypropylene material.

13. A method of assembling an energy storage device, the method comprising:

providing a housing which defines an internal space;

disposing a first electrode into the internal space of the housing;

disposing an electrolyte-impermeable-barrier-member, which comprises a base portion and at least one side wall extending from the base portion of the electrolyte-impermeable-barrier-member forming a receptacle structure, into the internal space of the housing in a manner so as to partition the internal space of the housing into a receptacle space bound by the electrolyte-impermeable-barrier-member and an intervening space between the housing and the electrolyte-impermeable-barrier-member, wherein the first electrode is in the intervening space between the housing and the electrolyte-impermeable-barrier-member;

disposing a second electrode in the receptacle space within the electrolyte-impermeable-barrier-member and disposing an electrolyte with respect to the electrolyte-impermeable-barrier-member in a manner so as to shield the electrolyte from direct contact with the housing, wherein the electrolyte interacts with the second electrode within the receptacle space of the electrolyte-impermeable-barrier-member and reaches through at least one through-hole of the receptacle structure of the electrolyte-impermeable-barrier-member to interact with the first electrode within the intervening space between the housing and the electrolyte-impermeable-barrier-member, wherein the at least one through-hole serves as a channel connecting the receptacle space of the electrolyte-impermeable-barrier-member and the intervening space between the housing and the electrolyte-impermeable-barrier-member.

14. The method according to claim 13, wherein disposing the second electrode in the receptacle space within the electrolyte-impermeable-barrier-member is subsequent to disposing the electrolyte with respect to the electrolyte-impermeable-barrier-member.

15. The method according to claim 13, wherein disposing the first electrode into the internal space of the housing comprises placing the first electrode on a base portion of the housing, wherein the housing comprises the base portion and at least one side wall extending from the base portion of the housing.

16. The method according to claim 15, wherein disposing the electrolyte-impermeable-barrier-member into the internal space of the housing comprises stacking the base portion of the electrolyte-impermeable-barrier-member directly on the first electrode, wherein the at least one through-hole of the electrolyte-impermeable-barrier-member is at the base portion of the electrolyte-impermeable-barrier-member.

17. The method according to claim 16, wherein disposing a second electrode in the receptacle space within the electrolyte-impermeable-barrier-member comprises placing the second electrode above the base portion of the electrolyte-impermeable-barrier-member, and wherein disposing the electrolyte with respect to the electrolyte-impermeable-barrier-member comprises disposing the electrolyte into the receptacle space within the electrolyte-impermeable-barrier-member.

18. The method according to claim 13, further comprising:

disposing an electrolyte-permeable-member within the receptacle space of the electrolyte-impermeable-barrier-member to cover over the at least one through-hole of the electrolyte-impermeable-barrier-member from within the electrolyte-impermeable-barrier-member.

19. The method according to claim 13, further comprising attaching a plug to an opening of the electrolyte-impermeable-barrier-member opposite the base portion of the electrolyte-impermeable-barrier-member to close the electrolyte-impermeable-barrier-member for encasing the second electrode within the electrolyte-impermeable-barrier-member, wherein the plug comprises an engagement element configured to engage a corresponding engagement element at the at least one side wall of the electrolyte-impermeable-barrier-member for removable attachment of the plug to the electrolyte-impermeable-barrier-member.

20. The method according to claim 19, wherein attaching the plug to the opening of the electrolyte-impermeable-barrier-member comprises moving the plug via an external tool removably coupled to an auxiliary engagement element of the plug to engage an engagement element of the plug with the corresponding engagement element of the electrolyte-impermeable-barrier-member for attaching the plug to the opening of the electrolyte-impermeable-barrier-member, wherein the auxiliary engagement element of the plug is directed outwards and away from the electrolyte-impermeable-barrier-member, and decoupling the external tool from the auxiliary engagement element of the plug after the plug is attached to the opening of the electrolyte-impermeable-barrier-member.

* * * * *